United States Patent [19] [11] 4,325,117
Parmet et al. [45] Apr. 13, 1982

[54] APPARATUS FOR CALCULATING A CHECK DIGIT FOR A STREAM OF DATA READ FROM A DOCUMENT

[75] Inventors: Arthur A. Parmet, Burlington; Charles W. Dawson, East Bridgewater, both of Mass.

[73] Assignee: Honeywell Information Systems Inc., Waltham, Mass.

[21] Appl. No.: 108,603

[22] Filed: Dec. 31, 1979

[51] Int. Cl.³ .............................................. G06F 11/08
[52] U.S. Cl. ....................................... 364/200; 371/53
[58] Field of Search ... 364/200 MS File, 900 MS File; 371/25, 53; 340/146.3 ED

[56] References Cited

U.S. PATENT DOCUMENTS

| | | | |
|---|---|---|---|
| 3,484,744 | 12/1969 | Gertler et al. | 371/53 |
| 3,675,202 | 7/1972 | Verhoeff | 371/53 |
| 3,711,830 | 1/1973 | Van der sel | 371/53 |
| 4,088,982 | 5/1978 | Haas | 340/146.3 ED |

*Primary Examiner*—Gareth D. Shaw
*Assistant Examiner*—Thomas M. Heckler
*Attorney, Agent, or Firm*—George Grayson; Nicholas Prasinos

[57] ABSTRACT

Information from a document is read by a reader sorter; the information is organized in fields including a transit field which is made up of 8 decimal digits and a check digit. The 8 decimal digits are each multiplied by a predetermined number which depends on the position of the decimal digit in the transit field as indicated by a position counter. Signals indicative of the decimal digit and the position in the transit field are applied to the address terminals of a Programmable Read Only Memory (PROM). Each address location stores the units position of the product of the multiplication of the decimal digit times the predetermined value. A firmware routine stored in a control memory performs the check digit calculation "on the fly" using the units position of the product from the PROM and certain status bits stored in a scratchpad memory.

8 Claims, 10 Drawing Figures

CONTENTS OF PROMS 114 AND 116

HEAD 1 (MICR)

| CHARACTERS | ADDRESS LOC. (HEX)<br>XLTQD1-3+00 (512-128)<br>RSDAT1-7+00 (64-1) | CONTENTS<br>DATC0-7+00 |
|---|---|---|
| SOD | 002 | 82 |
| DASH | 020 | 10 |
| SYMBOL | 023 | 20 |
| SYMBOL | 024 | 20 |
| DASH | 02D | 10 |
| NUMERIC | 030-039 | 04 |
| TRANSIT SYMBOL | 03C | 08 |
| CAN"T READ | 03F | 40 |
| MICR HEAD ID | 060 | A0 |
| RA2 (MICR) | 062 | E0 |
| OMR HEAD ID | 068 | 90 |
| OCR 3 HEAD ID | 070 | 88 |
| RA2 (OCR 3) | 072 | C8 |
| OCR 4 HEAD ID | 078 | 84 |
| RA2 (OCR 4) | 07A | C4 |
| FIELD FORMAT ERROR | 07C | 01 |
| EOD | 07F | 81 |
| UNUSED LOCATION |  | 00 |

HEAD 2 (OMR)

| CAN'T READ | 0C0-0E1 | 40 |
|---|---|---|
| MISSING TIMING MARK | 0E2 | 60 |
| CAN'T READ | 0E3-0E7 | 40 |
| OMR HEAD ID | 0E8 | 90 |
| CAN'T READ | 0E9-0EF | 40 |
| OCR 3 HEAD ID | 0F0 | 88 |
| CAN'T READ | 0F1 | 40 |
| RA2 (OCR 3) | 0F2 | C8 |
| CAN'T READ | 0F3-0F7 | 40 |
| OCR 4 HEAD ID | 0F8 | 84 |
| CAN'T READ | 0F9 | 40 |
| RA2 (OCR 4) | 0FA | C4 |
| CAN'T READ | 0FB | 40 |
| FIELD FORMAT ERROR | 0FC | 01 |
| CAN'T READ | 0FD-0FE | 40 |
| EOD | 0FF | 81 |
| UNUSED LOCATION |  | 00 |

CONTENTS OF PROMS 114 AND 116

HEAD 3 (OCR 3)

| CHARACTERS | ADDRESS LOC. (HEX)<br>XLTQD1-3+00 (512-128)<br>RSDAT1-7+00 (64-1) | CONTENTS<br>DATC0-7+00 |
|---|---|---|
| SOH | 102 | 82 |
| DASH | 120 | 10 |
| SYMBOL | 124-12F | 20 |
| NUMERIC | 130-139 | 04 |
| SYMBOL | 13C-13E | 20 |
| CAN'T READ | 13F | 40 |
| ALPHABETIC | 141-15A | 02 |
| SYMBOL | 156-15F | 20 |
| MICR HEAD | 160 | A0 |
| RA2 (MICR) | 162 | E0 |
| OMR HEAD | 168 | 90 |
| OCR 3 HEAD | 170 | 88 |
| RA2 (OCR 3) | 172 | C8 |
| OCR 4 HEAD | 178 | 84 |
| RA2 (OCR 4) | 17A | C4 |
| FIELD FORMAT ERROR | 17C | 01 |
| EOD | 17F | 81 |
| UNUSED LOCATION | | 00 |

HEAD 4 (OCR 4)

| SOH | 182 | 82 |
|---|---|---|
| DASH | 1A0 | 10 |
| SYMBOL | 1A4-1AF | 20 |
| NUMBERIC | 1B0-1B9 | 04 |
| SYMBOL | 1BC-1BE | 20 |
| CAN'T READ | 1BF | 40 |
| ALPHABETIC | 1C1-1DA | 02 |
| SYMBOL | 1DC-1DF | 20 |
| MICR HEAD | 1E0 | A0 |
| RA2 (MICR) | 1E2 | E0 |
| OMR HEAD | 1E8 | 90 |
| OCR 3 HEAD | 1F0 | 88 |
| RA2 (OCR 3) | 1F2 | C8 |
| OCR 4 HEAD | 1F8 | 84 |
| RA2 (OCR 4) | 1FA | C4 |
| FIELD FORMAT ERROR | 1FC | 01 |
| EOD | 1FF | 81 |
| UNUSED LOCATION | | 00 |

| NUMERIC | ADDRESS LOC. (HEX) RSDAT2-7+00(32-1) FLDCT0-3+00(512-64) | CONTENTS (HEX) CDGDT0-3+00 |
|---|---|---|

CODE FOR CHECK DIGIT POSITION NOTE - EXCESS-6 NOT ADDED
TO VALUES FOR THIS POSITION ONLY CHARACTER PSN COUNTER = 0

| 0 | 030 | 0 |
|---|---|---|
| 1 | 031 | 1 |
| 2 | 032 | 2 |
| 3 | 033 | 3 |
| 4 | 034 | 4 |
| 5 | 035 | 5 |
| 6 | 036 | 6 |
| 7 | 037 | 7 |
| 8 | 038 | 8 |
| 9 | 039 | 9 |

FIELD POSITION 1 MULTIPLIER=7
CHARACTER PSN COUNTER = 1

| 0 | 070 | 6 |
|---|---|---|
| 1 | 071 | D |
| 2 | 072 | A |
| 3 | 073 | 7 |
| 4 | 074 | E |
| 5 | 075 | B |
| 6 | 076 | 8 |
| 7 | 077 | F |
| 8 | 078 | C |
| 9 | 079 | 9 |

FIELD POSITION 2 MULTIPLIER=3
CHARACTER PSN COUNTER = 2

| 0 | 0B0 | 6 |
|---|---|---|
| 1 | 0B1 | 9 |
| 2 | 0B2 | C |
| 3 | 0B3 | F |
| 4 | 0B4 | 8 |
| 5 | 0B5 | B |
| 6 | 0B6 | E |
| 7 | 0B7 | 7 |
| 8 | 0B8 | A |
| 9 | 0B9 | D |

| NUMERIC | ADDRESS LOC. (HEX) RSDAT2-7+00(32-1) FLDCT0-3+00(512-64) | CONTENTS (HEX) CDGDT0-3+00 |
|---|---|---|

FIELD POSITION 3  MULTIPLIER=1
CHARACTER PSN COUNTER = 3

| | | |
|---|---|---|
| 0 | 0F0 | 6 |
| 1 | 0F1 | 7 |
| 2 | 0F2 | 8 |
| 3 | 0F3 | 9 |
| 4 | 0F4 | A |
| 5 | 0F5 | B |
| 6 | 0F6 | C |
| 7 | 0F7 | D |
| 8 | 0F8 | E |
| 9 | 0F9 | F |

FIELD POSITION 4  MULTIPLIER=7
CHARACTER PSN COUNTER = 4

| | | |
|---|---|---|
| 0 | 130 | 6 |
| 1 | 131 | D |
| 2 | 132 | A |
| 3 | 133 | 7 |
| 4 | 134 | E |
| 5 | 135 | B |
| 6 | 136 | 8 |
| 7 | 137 | F |
| 8 | 138 | C |
| 9 | 139 | 9 |

FIELD POSITION 5  MULTIPLIER=3
CHARACTER PSN COUNTER = 5

| | | |
|---|---|---|
| 0 | 170 | 6 |
| 1 | 171 | 9 |
| 2 | 172 | C |
| 3 | 173 | F |
| 4 | 174 | 8 |
| 5 | 175 | B |
| 6 | 176 | E |
| 7 | 177 | 7 |
| 8 | 178 | A |
| 9 | 179 | D |

| NUMERIC | ADDRESS LOC. (HEX)<br>RSDAT2-7+00(32-1)<br>FLDCT0-3+00(512-64) | CONTENTS (HEX)<br>CDGDT0-3+00 |
|---|---|---|

FIELD POSITION 6 MULTIPLIER = 1
CHARACTER PSN COUNTER = 6

| | | |
|---|---|---|
| 0 | 1B0 | 6 |
| 1 | 1B1 | 7 |
| 2 | 1B2 | 8 |
| 3 | 1B3 | 9 |
| 4 | 1B4 | A |
| 5 | 1B5 | B |
| 6 | 1B6 | C |
| 7 | 1B7 | D |
| 8 | 1B8 | E |
| 9 | 1B9 | F |

FIELD POSITION 7 MULTIPLIER = 7
CHARACTER PSN COUNTER = 7

| | | |
|---|---|---|
| 0 | 1F0 | 6 |
| 1 | 1F1 | D |
| 2 | 1F2 | A |
| 3 | 1F3 | 7 |
| 4 | 1F4 | E |
| 5 | 1F5 | B |
| 6 | 1F6 | 8 |
| 7 | 1F7 | F |
| 8 | 1F8 | C |
| 9 | 1F9 | 9 |

FIELD POSITION 8 MULTIPLIER = 3
CHARACTER PSN COUNTER = 8

| | | |
|---|---|---|
| 0 | 230 | 6 |
| 1 | 231 | 9 |
| 2 | 232 | C |
| 3 | 233 | F |
| 4 | 234 | 8 |
| 5 | 235 | B |
| 6 | 236 | E |
| 7 | 237 | 7 |
| 8 | 238 | A |
| 9 | 239 | D |

APPARATUS FOR CALCULATING A CHECK DIGIT FOR A STREAM OF DATA READ FROM A DOCUMENT

RELATED APPLICATIONS

1. "Apparatus for Translation of Character Codes for Application to a Data Processing System" by Arthur A. Parmet and Charles W. Dawson, and having U.S. Ser. No. 098,456 and filed on Nov. 28, 1979.

2. "Queue Symbol Field Recovery Flags For Defining Boundaries of One or More Fields of a Document Read by A Reader Sorter" by Arthur A. Parmet and Charles W. Dawson, and having U.S. Ser. No. 098,274 and filed on Nov. 28, 1979.

BACKGROUND OF THE INVENTION

Field of Use

This invention relates generally to the reading of documents by a reader sorter, for selecting a pocket into which the document is sorted; and more specifically, to the verification of the transit field of the documents by means of the check digit calculation and expansion with the check digit on the field.

General

The American Banking Association (ABA) established a new standard for the format of the Magnetic Ink Character Recognition (MICR) transit field on a check. This standard was effective July 1, 1975. The 1977 edition of "ABA Key to Routing Numbers" published by Rand-McNally, Financial Publications Division, Chicago, Ill. 60680, provides the details of the standard.

The transit field includes a transit character which both opens and closes the field, 4 decimal digits indicating the Federal Reserve Routing Symbol, 4 decimal digits indicating the Institution bank's ABA suffix and a check digit. The ABA defined the calculation for generating the check digit.

Description of the Prior Art

A variety of different forms of error detection are built into data handling equipment. Such error detecting apparatus assume particular importance when data is read from a document and transmitted from that reading device to another device within a data processing system.

Several schemes and devices have been utilized in error control. Perhaps the most common method of detecting errors is the use of parity. With this method, the digits of a binary word are inspected and an extra digit or bit (binary digit) is added. This digit is chosen to be "ZERO" or "ONE" as necessary to keep the total number of digits in the "ONE" state either odd or even according to a predetermined convention. Another single error correcting code is the Hamming code where parity-checked digits are assigned to particular positions where their weights indicate which digits of the whole code are in error.

The Honeywell Level 66 computing system processes documents read on the H234X, H234Y or H236 Reader Sorter using the Hudel Software language. This is described in the Document Entry Subsystem Handbook for the Series 60, Level 66 system, Order No. DE07, published in February, 1977 by Honeywell Information Systems Inc. The check digit processing software routine is described on pages 2 through 7 of the aforementioned handbook. The processing of the check digit through software had the disadvantage of requiring an excessive amount of central processor cycles, thereby reducing the system throughout.

OBJECTS OF THE INVENTION

Accordingly, it is a primary object of the invention to provide a document sorting system with improved performance.

It is another object of the invention to provide a document sorting system with improved apparatus for defining the fields read from the document by the reader sorter.

It is still another object of the invention to provide a document sorting system with improved apparatus for translating the queue symbols to the queue field identifier characters.

It is yet another object of the invention to provide a document sorting system with improved apparatus for identifying queue symbols and pseudo queue field identifiers for defining fields read from the document.

BRIEF DESCRIPTION OF THE DRAWINGS

The novel features which are characteristic of the invention are set forth with particularity in the appended claims. The invention itself, however, both as to organization and operation, may best be understood by reference to the following description in conjunction with the drawings in which:

FIG. 8 shows the contents of the programmable read only memory which stores codes identifying the characters.

FIG. 10 shows the contents of the programmable read only memory which stores the multiplication tables.

SUMMARY OF THE INVENTION

A document processing system includes a central processor unit, a main memory, a peripheral controller, and microprogrammed device controllers all coupled in common to a system bus. A reader sorter is coupled to a reader sorter adapter (RSA) which is in turn coupled to the microprogrammed device controller (MDC).

The reader sorter reads MICR characters from a document organized in fields. A transit field read by the reader sorter includes 8 decimal digits, a check digit and 2 transit characters defining the field.

The RSA includes a character position counter (CPC) for indicating the position of the decimal digits in the transit field and a check digit lookup table programmable read only memory (PROM) which stores the units position of the result of the multiplication of the decimal digit by a predetermined constant. A predetermined constant exists for each character position in the transit field.

Signals indicating the value of the numeric digit in ASCII code and signals indicating the numeric digit position in the transit field are applied to the address terminals of the PROM. The selected address location stores the units position of the product, in hexadecimal excess-6 form, of the result of the multiplication of the numeric digit by the predetermined constant associated with the character position.

A firmware routine stored in the control store in the MDC identifies the transit character, controls the loading and incrementing of the CPC, and, in conjunction with an arithmetic logic unit and a scratch pad memory, performs the check digit calculation and verification in a sequential manner as transit field decimal digits are processed through the RSA and MDC along with the units position of the product.

DESCRIPTION OF THE PREFERRED EMBODIMENT

Figure 1:
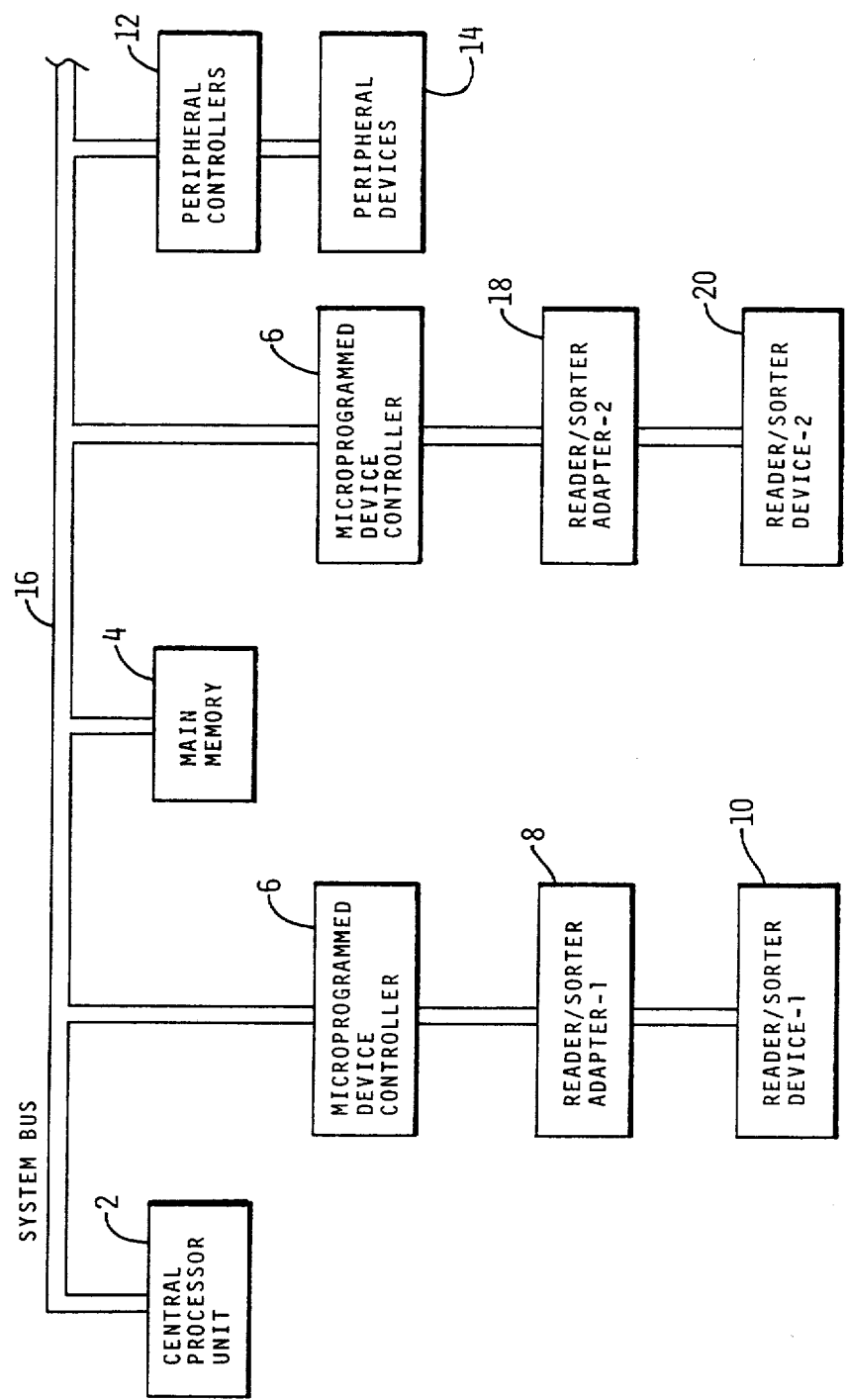
FIG. 1 is an overall block diagram of the system.

FIG. 1 shows the Document Processing System which includes a central processor unit (CPU) 2, a main memory 4, a plurality of peripheral controllers 12, and a plurality of microprogrammed device controllers (MDC) 6, all coupled in common to a system bus 16.

Coupled to the MDC 6 may be a Reader Sorter Adapter 1 (RSA1) 8 or a Reader Sorter Adapter 2 (RSA2) 18. A Reader Sorter Device-1 (RSD-1) 10, which may be a Honeywell Model DHU9840 device, is coupled to the RSA1 8; and a Reader Sorter Device-2 (RSD-2) 20, which may be a Honeywell Model 234-0 or a 236, is coupled to the RSA2 18.

The MDC 6 is disclosed in U.S. Pat. No. 4,003,033 entitled "Architecture for a Microprogrammed Device Controller" and by this reference is incorporated into and made part of this specification.

The Document Processing System reads documents in the Reader Sorter Device-1 10 sequentially from up to four read heads. A first read head reads MICR (Magnetic Ink Character Recognition) characters, a second read head reads OMR (Optical Mark Recognition) words, and a third and fourth read heads read OCR (Optical Character Recognition) characters. The information from the document is read through the RSA1 8 and MDC 6 onto the system bus 16 to main memory 4 and is processed by the CPU 2. Selected characters may be stored in main memory 4 for further processing.

The CPU 2 processes the information under program control and sends return signals via the system bus 16, the MDC 6, and the RSA1 8 to the Reader Sorter Device-1 10, thereby indicating the pocket into which the document is sorted.

The MDC 6 is a microprogrammed peripheral controller which performs general purpose control functions such as executing system bus sequences, providing command storage, transferring and editing data, and establishing the general flow of command execution.

The RSA1 8 contains all the unique hardware necessary to dialogue with the Reader Sorter Device-1 10.

This embodiment describes the relationship between the MDC 6 and the RSA1 8. It is understood that RSA2 18 and Reader Sorter Device-2 20 operate with the MDC 6 in a similar manner as RSA1 8.

A character position counter (CPC) 26 stores the character position of the character in the transit field being processed through RSA1 8. Input signals ALUOT0-7+00 set CPC 26 to hexadecimal F (1111) when the transit character is being processed by MDC 6 firmware. Control signals PCDEC 2 control the operation of CPC 26 output signals FLDCT0-3+00 which are applied to the address terminals of a check digit look up table (PROM) 28. Data signals RSDAT 2-7 are also applied to the address terminals of PROM 28. Signals indicating the numeric value of the input data character and its position in the transit field are applied to the address terminals of PROM 28. These signals select the address location of the units position of the result, in excess-6 form, of the multiplication of the numeric value by a predetermined number indicated by the position of the numeric characters in the field.

PROM 28 output signals CDGDT0-3+00 and CPC 26 output signals FLDCT0-3+00 are applied to MDC 6 through MUX 42 for processing by the firmware.

Figure 2:
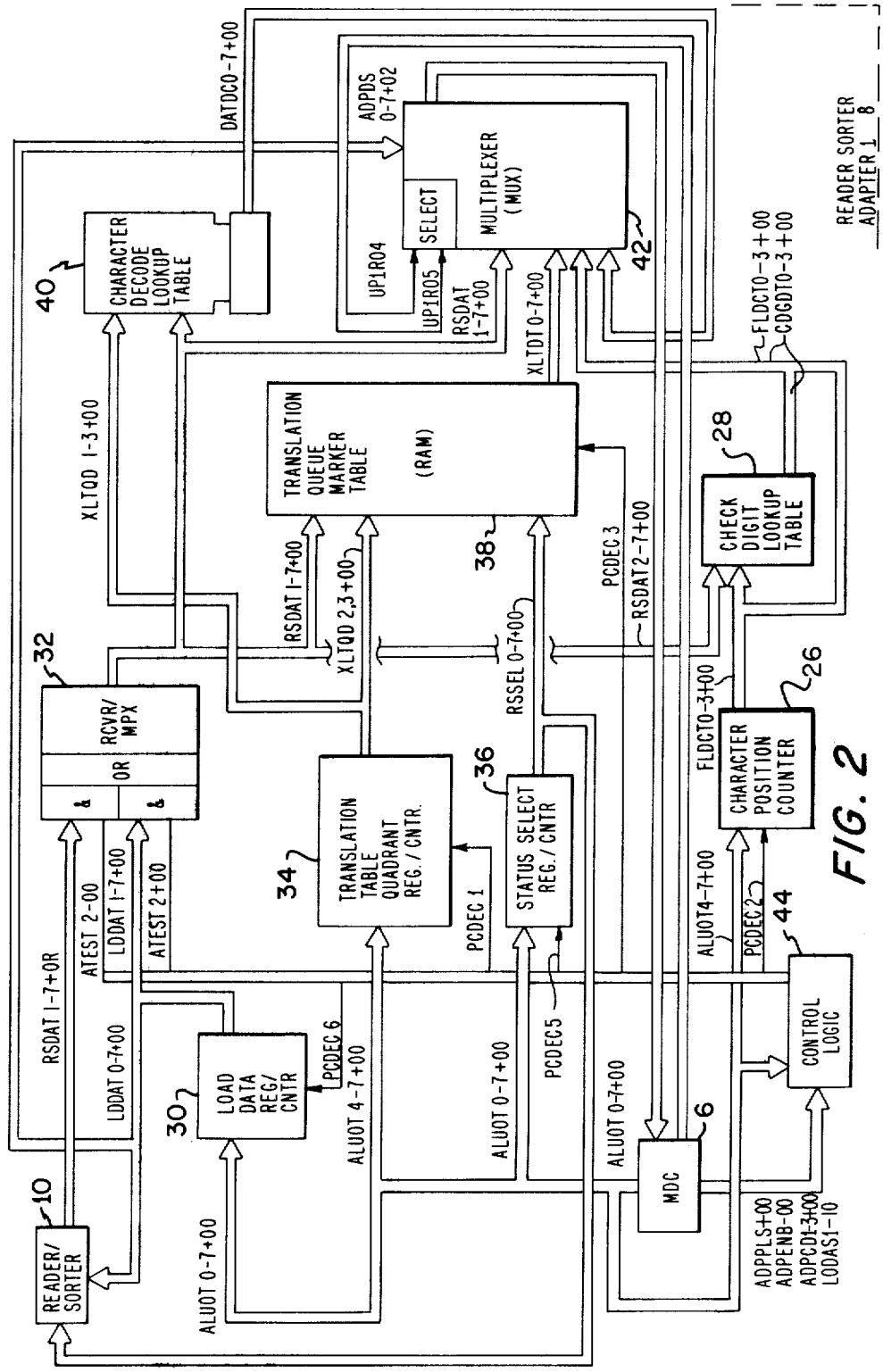
FIG. 2 is a block diagram of the reader sorter adapter.

Referring to FIG. 2, the RSA1 8 includes a Translation and Queue Marker Table Random Access Memory (RAM) 38 for storing, in 512 addressable locations, character codes which are transferred to a multiplexer 42 as signals XLTDT0-7+00, and in turn to the MDC 6 as signals ADPDS0-7+02.

Document character code signals are applied to a receiver/multiplexer 32 of RSA1 8 as signals RSDAT 1-7 (7 bits), and are applied to the address select terminals of RAM 38 to select the address locations storing the equivalent character code for transfer to MDC 6. A code identifying the particular head reading the document is stored in a Translation Table Quadrant Register/Counter 34. Signals XLTQD 2,3+00, applied to the address select terminals of RAM 38, select the 128 address locations in RAM 38 storing corresponding characters associated with a particular head.

| Head Number | Character Field | XLTQD 2 | 3 |
|---|---|---|---|
| 1 | MICR | 0 | 0 |
| 2 | OMR | 0 | 1 |
| 3 | OCR | 1 | 0 |
| 4 | OCR | 1 | 1 |

The RAM 38 is loaded initially with character codes that will be used by the CPU 2. These character codes include format characters, font select characters and data characters, and may be ASCII, EBCDIC, binary coded decimal, or any other appropriate code as required for the current sorting application.

A Load Data Register/Counter 30 applies output signals LDDAT1-7+00 to receiver/multiplexer 32. The Counter 30 is initially set to hexidecimal ZERO and incremented through 128 address locations under firmware control. Similarly, Counter 34 is reset to binary ZERO and incremented once every 128 character transfers for writing the 512 character codes into RAM 38.

The character code is applied to a Status Select Register/Counter 36 from the MDC 6 via signals ALUOT 0-7+00 and applied to RAM 38 as signals RSSEL0-7+00.

RAM 38, therefore, is loaded initially with the character codes required by the CPU 2.

During the reading of the document, the characters are translated into the required code by RAM 38. Signals LDDAT 0-7+00 are applied to the Reader Sorter 10 and indicate the pocket into which the document is to be sorted.

The Reader Sorter Adapter-1 8 is controlled by logic signals ADPPLS-+00, ADPENB-00, ADPCD1-3+00, and LODAS1-10, which are applied to control logic 44 from MDC 6. Output signals PCDEC 1,3,5 and 6 initiate the required cycles of loading, clearing, writing and incrementing as shown in the timing diagram of FIG. 4.

Character code signals RSDAT 1-7+00 and translation table quadrant signals XLTQD 1-3+00 are applied to the address selection terminals of a character decode lookup table 40. Output signals DATDC0-7+00 are coded to indicate the type of character received by RSA1 8; that is, if it is a numeric; an alphabetic, a control, or a formatting character.

Signals UP1RO4 and UP1RO5 are generated by MDC 6 and applied to the select terminals of MUX 42 to transfer the selected MUX 42 output signals to MDC 6. Signals ATEST2+00 and ATEST2-00, applied to RCVR/MPX 32, are generated by control logic 44 to select either the load operation or the translate operation.

Figure 3:
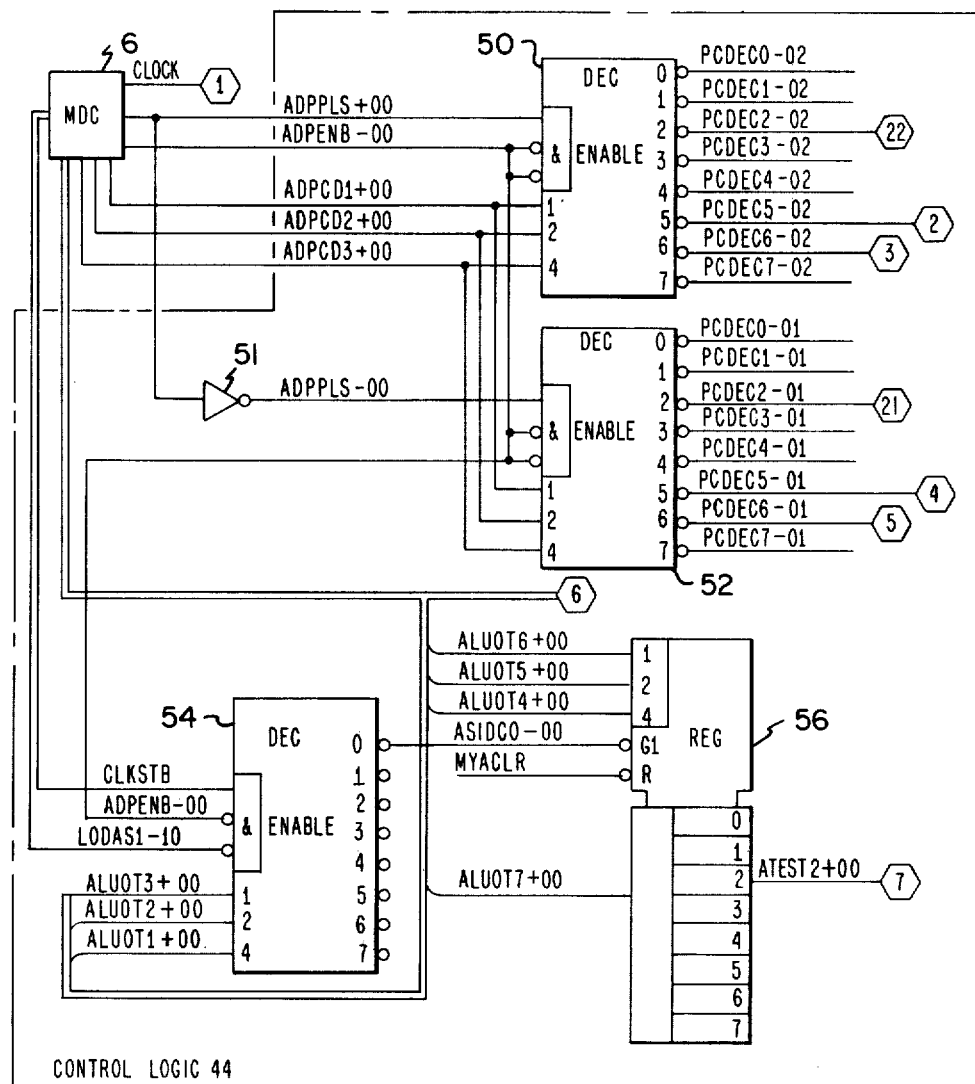
FIG. 3 is a detailed logic diagram of the reader sorter adapter.
Figure 3:
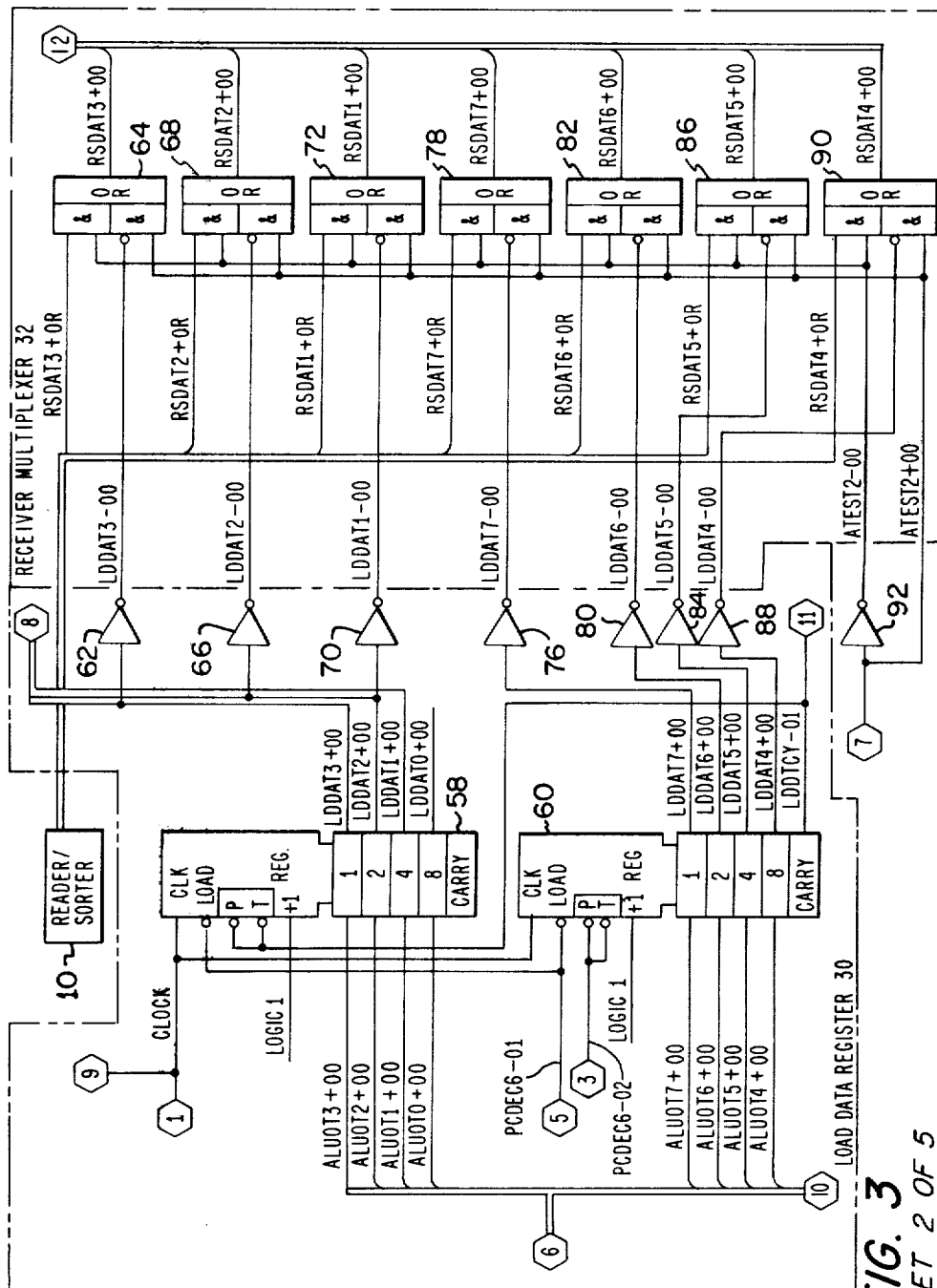
Figure 3:
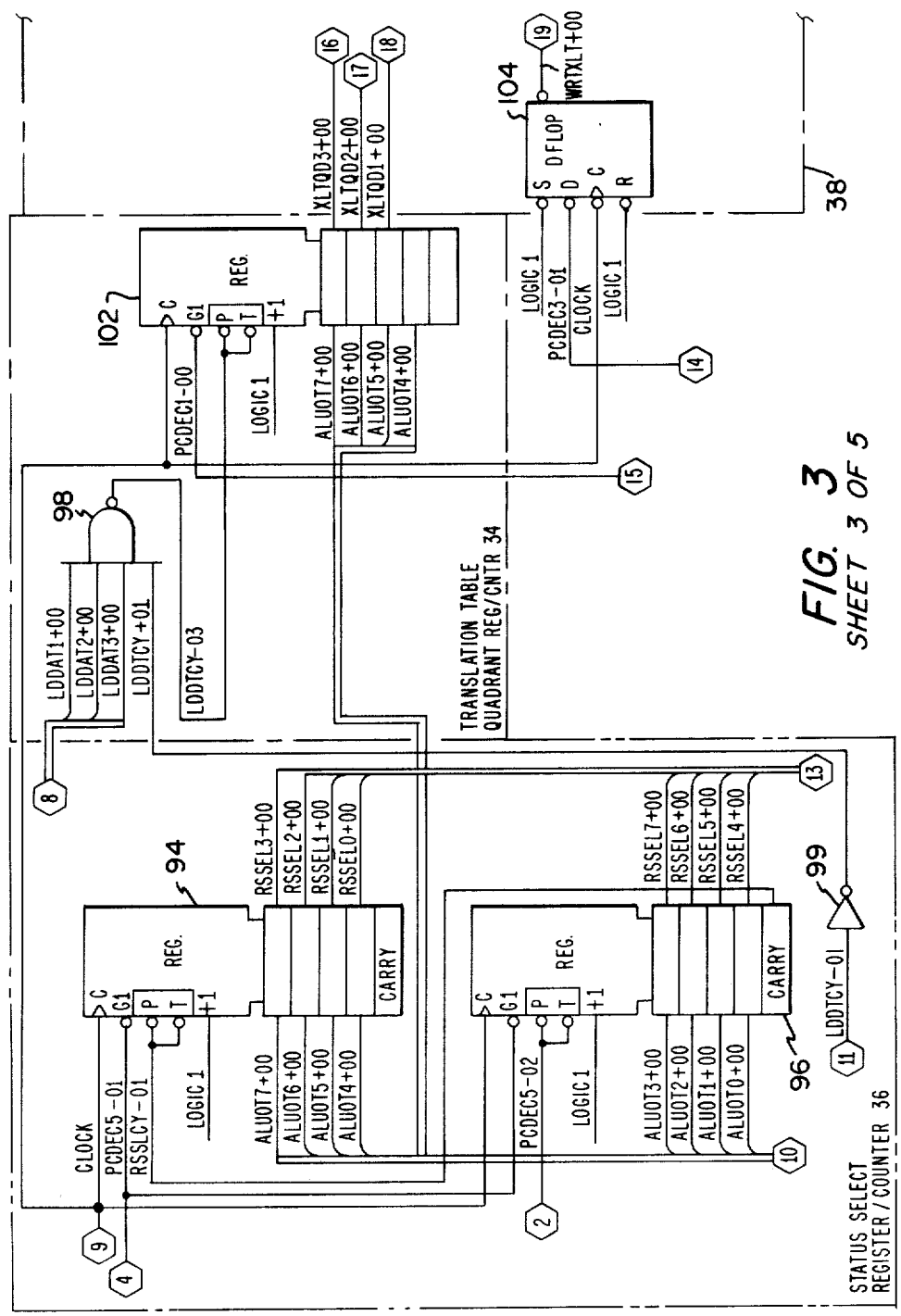
Figure 3:
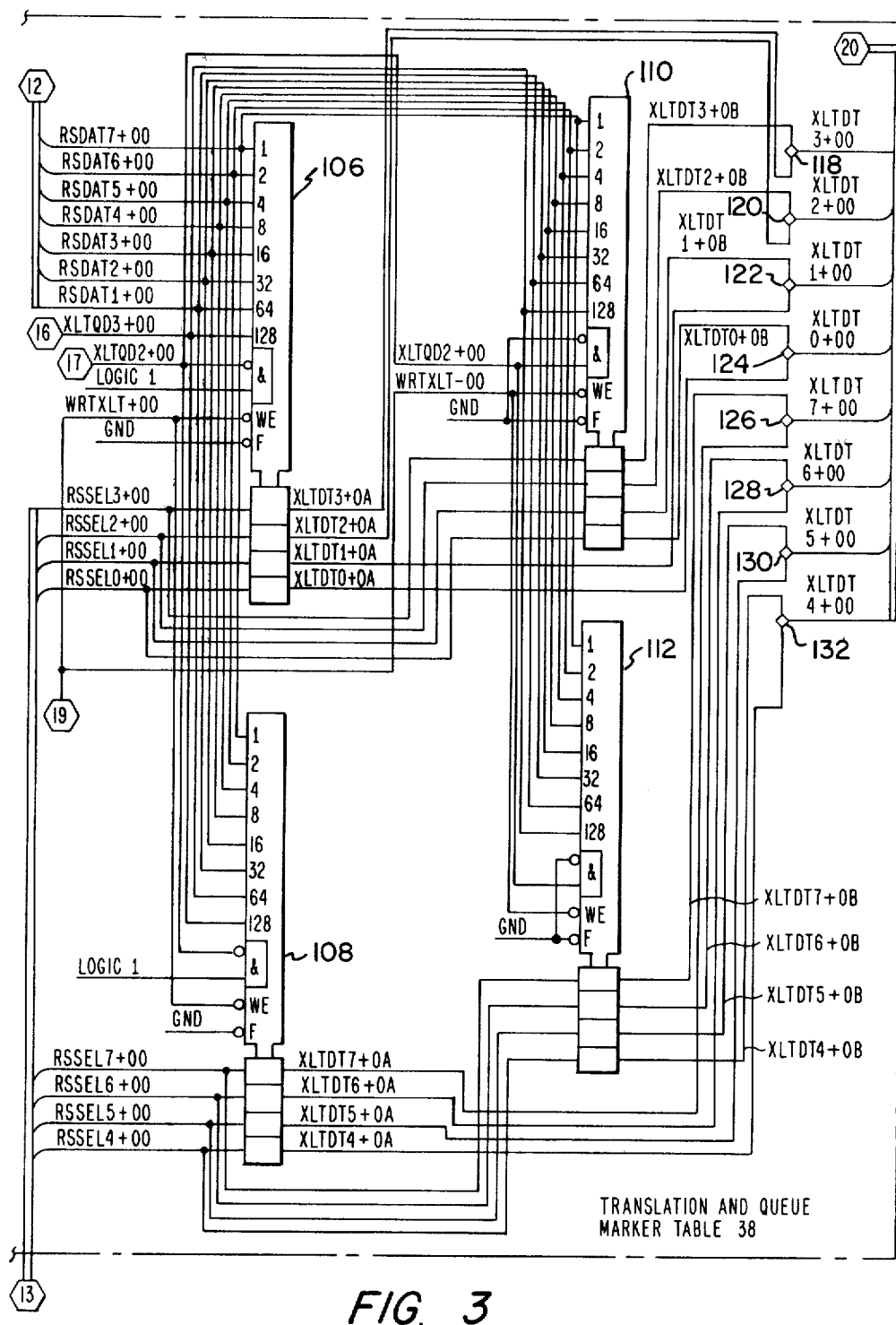
Figure 3:
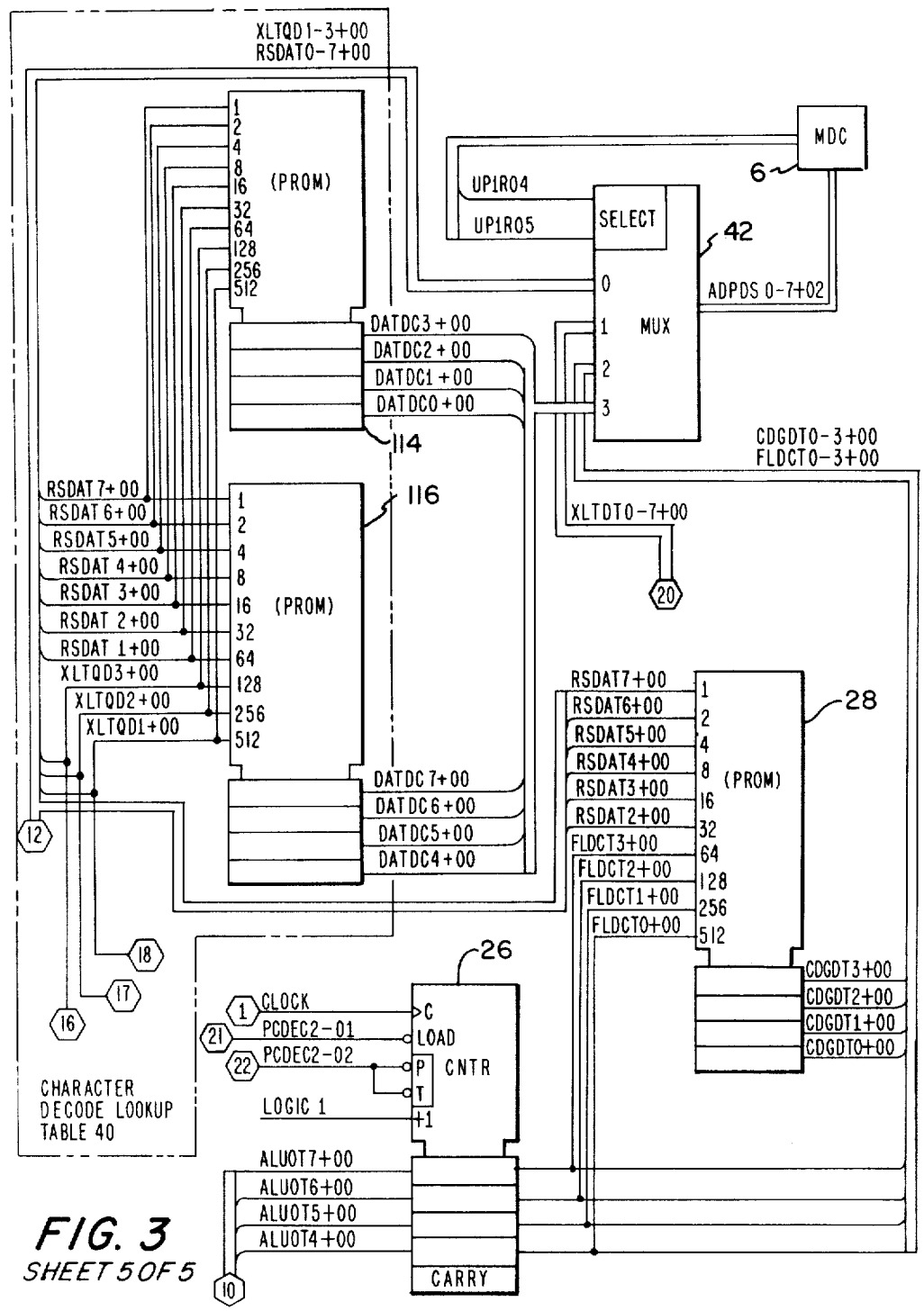

Referring to FIG. 3, the Translation and Queue Marker Table RAM 38 includes random access memories (RAMs) 106, 108, 110 and 112, which are 2101A memory circuits described in the Intel Data Catalog 1978, pages 3-26. The catalog is published by Intel Corporation, 3015 Bowers Avenue, Santa Clara, Calif. 95051.

During the document reading operation, character code signals are received from Reader Sorter 10 over signal lines RSDAT1-7+OR, and are applied to receiver/multiplexer 32, which includes receiver/multiplexers 64, 68, 72, 78, 82, 86 and 90. Control signal ATEST 2-00 is at logical ONE for the document reading operation. Output signals RSDAT1-7+00 are applied to the address select inputs of RAMs 106, 108, 110 and 112. Counter 102 of Translation Table Quadrant Register/Counter 34 provides signal XLTQD2+00, which enables RAMs 106 and 108 or RAMs 110 and 112. Signal XLTQD3+00 is applied to the address select terminal 128. Address locations 000 through $127_{10}$ of RAMs 106 and 108 store characters decoding the characters on the document read by head 1. Address locations $128_{10}$ through $255_{10}$ of RAMs 106 and 108 store characters decoding the characters on the document read by head 2. Similarly, address locations 000 through $127_{10}$ of RAMs 110 and 112 are associated with head 3, and address locations $128_{10}$ through $255_{10}$ with head 4.

The output of RAMs 106 and 108, signals XLTDT 0-7+OA, and RAMs 110 and 112, signals XLTDT0-7+OB, are applied to wired OR circuits 118 through 132. The output signals XLDT0-7+00 are applied to input terminal 1 of MUX 42.

Initially the RAMs 106, 108, 110 and 112 are loaded with character codes compatible with the data processing system of the Document Processing System, namely, the CPU 2, main memory 4, and MDC 6. The character codes include data characters as well as control characters.

The load operation is initiated by MDC 6 sending hexadecimal 05 over signal lines ALUOT1-7+00 with control signals ADPENB-00 and LODAS1-10 at logical ZERO to Control Logic 44. This enables a decoder 54 and output signal AS1DCO-00, forced to logical ZERO at the rise of clock strobe signal CLKSTB, to enable the loading of a register 56. Since signals ALUOT5+00 and ALUOT7+00 are at logical ONE, output signal ATEST2+00 is at logical ONE. Signal ATEST2-00, the output of an inverter 92, is at logical ZERO. This selects the load signals LDDAT1-7-00, the output of inverters 62, 66, 70, 76, 80, 84 and 88, through receiver/multiplexers 64, 68, 72, 78, 82, 86 and 90, as output signals RSDAT1-7+00. This is shown in clock cycle A of the timing chart of FIG. 4. On the next clock cycle (cycle B, FIG. 4), hexadecimal 00 is sent over signal lines ALUOT0-7+00 along with signals ADPENB-00 and ADPPLS+00 at logical ZERO, thereby enabling a decoder 52. Signal ADPPLS-00 is at logical ONE as the output of an inverter 51. Output signal PCDEC6-01 at logical ZERO is applied to the LOAD terminals of load data registers 58 and 60. Signal ADPCD1+00 is at logical ZERO and signals ADPCD2+00 and ADPCD3+00 are at logical ONE. Hexadecimal 00 is set into registers 58 and 60 since signals ALUOT0-7+00 are at logical ZERO.

Figure 4:
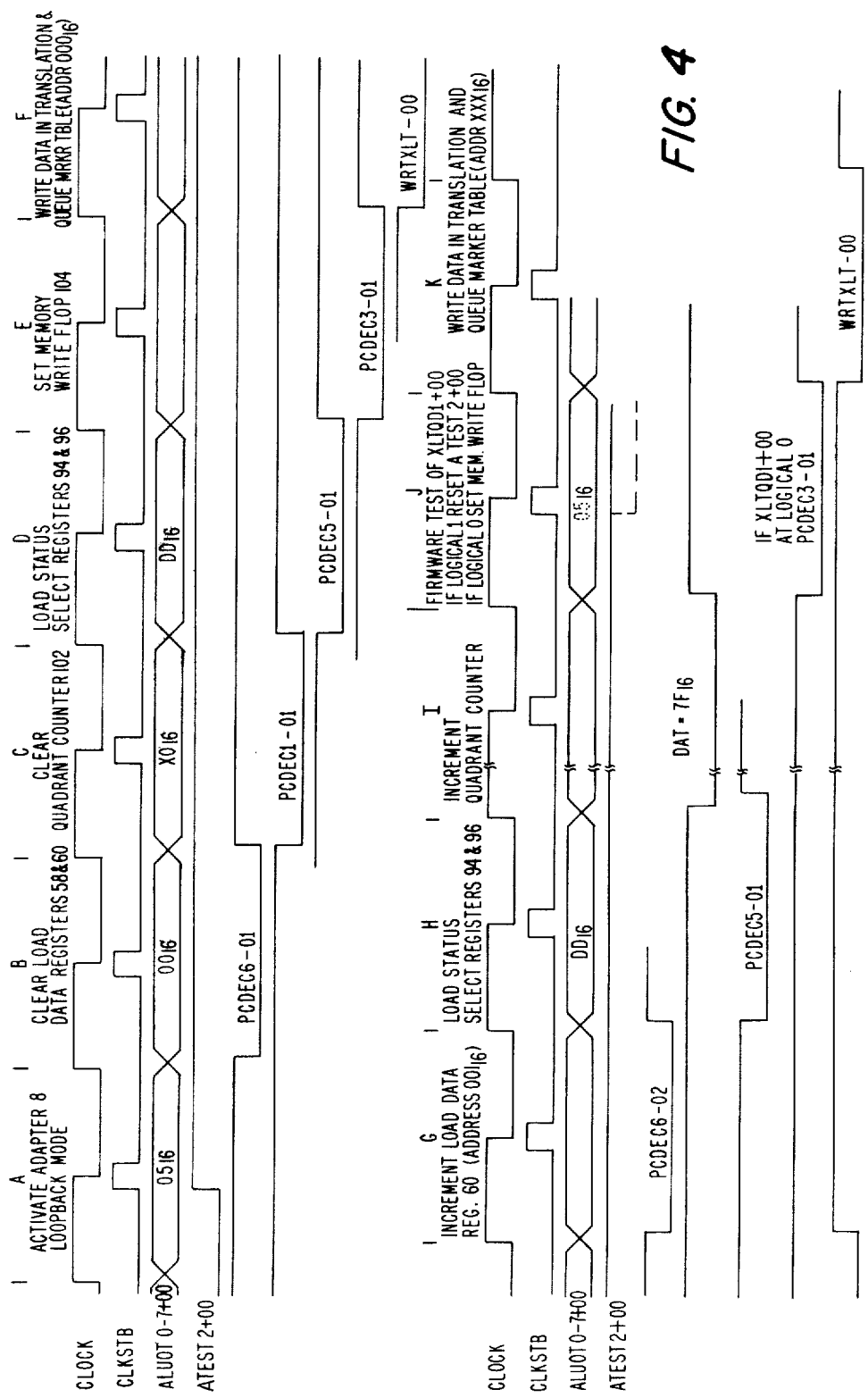
FIG. 4 is a timing diagram showing the load data operation.

Signals ALUOT4-7+00 are at logical ZERO during clock cycle C, FIG. 4, and signals from MDC 6 force the PCDEC1-01 output signal of decoder 52 to logical ZERO. This forces counter 102 to hexadecimal ZERO for decoding the address locations of RAMs 106 and 108 with translated character codes read by head 1 of Reader Sorter 10.

During cycle D, FIG. 4, control signal PCDEC5-01, the output of decoder 52, is forced to logical ZERO enabling counters 94 and 96 to store the first translated character code received over signal bus ALUOT0-7+00 from MDC 6.

On the next clock cycle (cycle E, FIG. 4), a D flop 104 is set on the rise of the CLOCK signal when signal PCDEC3-01 is at logical ZERO, thereby forcing the write pulse signal WRTXLT-00 to logical ZERO.

On the next clock cycle (cycle F, FIG. 4), the data stored in the status select registers 94 and 96 are written into address location 000 of RAMs 106 and 108 via signal lines RSSEL0-7+00.

On the next cycle (cycle G, FIG. 4), control signal ADPPLS+00 is at logical ONE, thereby enabling a decoder 50, and signal PCDEC6-02 is forced to logical ZERO, thereby incrementing load data register 60 to 001; and, on the next cycle (cycle H, FIG. 4), the next data character is loaded into registers 94 and 96, and cycles D, E, F and G are repeated until the registers 58 and 60 store hexadecimal 7F. That is, signals LDDAT1-7-00 are at logical ONE, indicating address location $127_{10}$. On the next increment load data register clock cycle (cycle G, FIG. 4), the carry signal LDDTCY-01 of register 60 is forced to logical ZERO, which increments load data register 58 on the next rise of the CLOCK signal. This forces the LDDAT0+00 signal to logical ONE, and signals LDDAT1-7+00 to logical ZERO.

Also, the carry signal LDDTCY+01, the output of an inverter 99, is applied to a NAND gate 98. Since signals LDDAT1-3+00 are also at logical ONE during this cycle, the output signal LDDTCY-03 at logical ZERO is applied to the PT terminals of counter 102. This increments counter 102, and output signal XLTQD3+00 is forced to logical ONE. This enables the selection of address locations $128_{10}$ through $255_{10}$ of RAMs 106 and 108. This is shown in cycle I, FIG. 4.

Signals LDDAT0+00 at logical ONE and LDDAT1+00 at logical ZERO indicate to MDC 6 that the head 1 character sequence is completed and registers 58 and 60 store address location 000. When the head 2 character sequence is completed, counter 102 is incremented as described supra through NAND gate 98 and NOR gate 100, forcing signal XLTQD2+00 to logical ONE and XLTQD3+00 to logical ZERO. On the next clock cycle, signals LDDAT0+00 and LDDAT1+00 are at logical ZERO, indicating to the MDC 6 that the head 2 character sequence is completed.

Signal XLTQD2+00 at logical ONE selects RAMs 110 and 112, and the above sequence is repeated for the heads 3 and 4 character sequences. This time, when counter 102 is incremented, signal XLTQD1+00 is forced to logical ONE. This indicates to MDC 6 that the load operation is completed and, as shown in cycle J, FIG. 4, signal ATEST2+00 is forced to logical ZERO in register 56. If signal XLTQD1+00 is at least ZERO, then in cycle J, FIG. 4, signal PCDEC3-01 is forced to logical ZERO by MDC 6 and the memory write flop 104 is set and cycle K is a write data cycle as in cycle E.

PROMs 114 and 116 of character decode lookup table 40 receive character code signals RSDAT1-7+00 and translation table quadrant signals XLTQD1-3+00, and provide output signals DATDC0-7+00 as described supra.

CPC 26 is set to hexadecimal F when the first transit character is detected by the firmware in MDC 6. Signals ALUOT4-7+00 are at logical ONE when control signal PCDEC2-01, applied to the load input of CPC 26, is at logical ZERO. As each character in the transit field is detected by the firmware in MDC 6, CPC 26 is incremented on the rise of the clock pulse when control signal PCDEC2-02 is at logical ZERO. The output signals FLDCT0-3+00 are applied to the address terminals 512, 256, 128 and 64 respectively on PROM 28 and indicate the position in the transit field of the numeric characters read from the read sorter 10 read into RSA1 8. Signals RSDAT2-7+00, indicative of the ASCII numeric value of the transit field characters, are applied to address terminals 32, 16, 8, 4, 2 and 1 respectively of PROM 28. The output signals CDGD0-3+00 from PROM 28 and FLDCT0-3+00 from CPC 26 are applied to MDC 6 via terminal 2 of MUX 42 over signal line ADPDS0-7-30 02.

Figure 5:
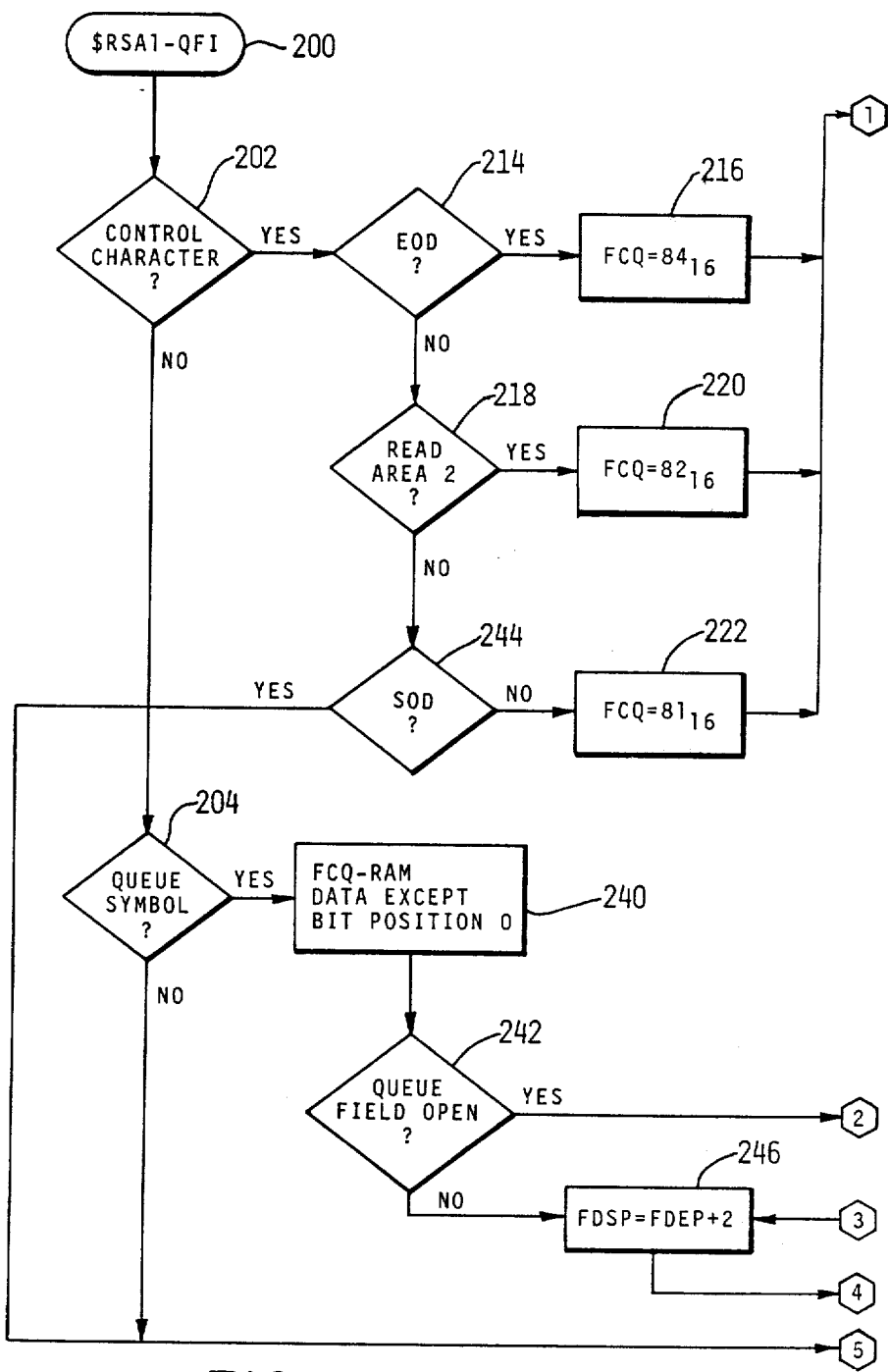
FIG. 5 is a flow diagram of the firmware sequences in the microprogrammed device controller which identifies the fields.
Figure 5:
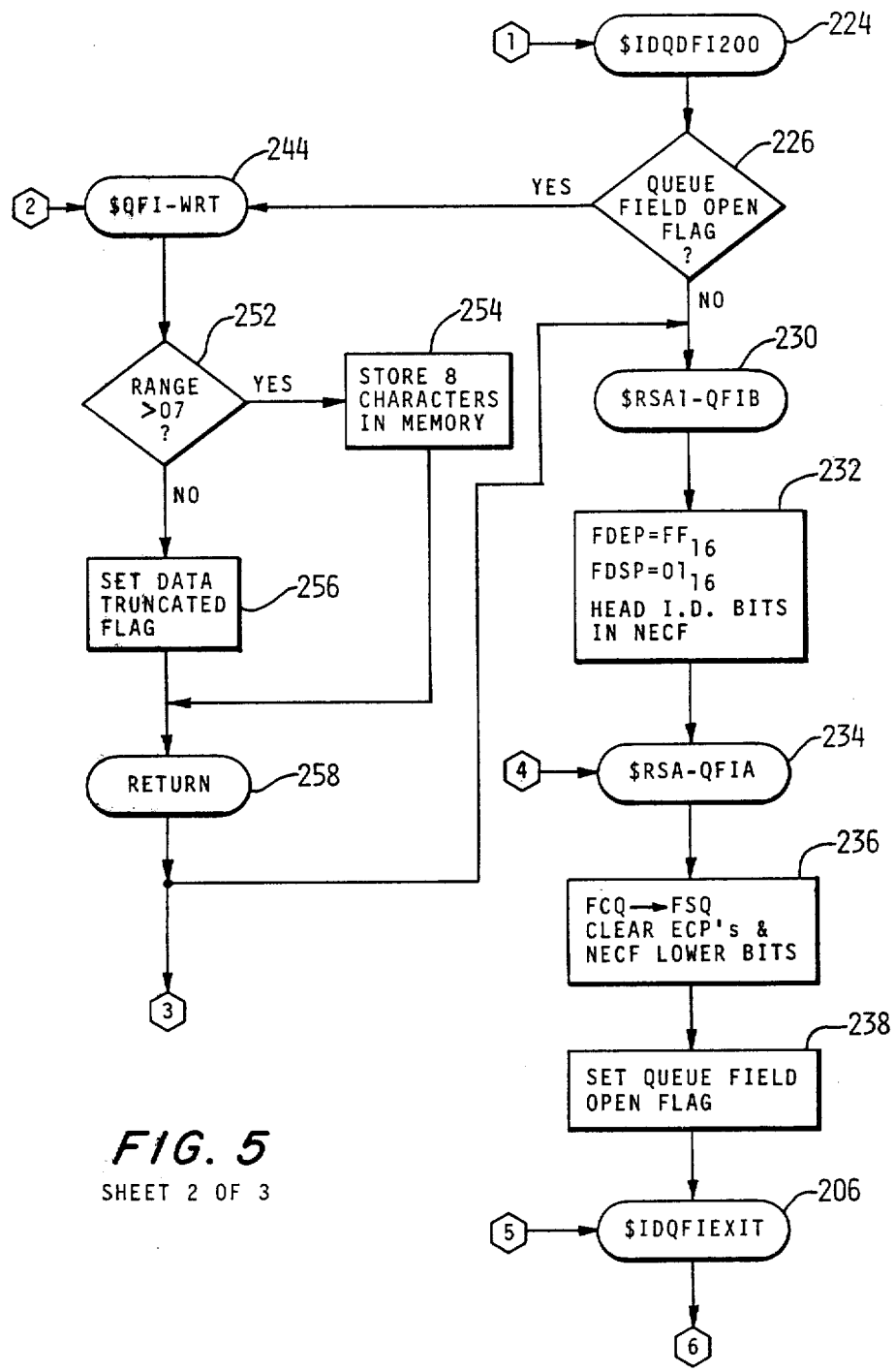
Figure 5:
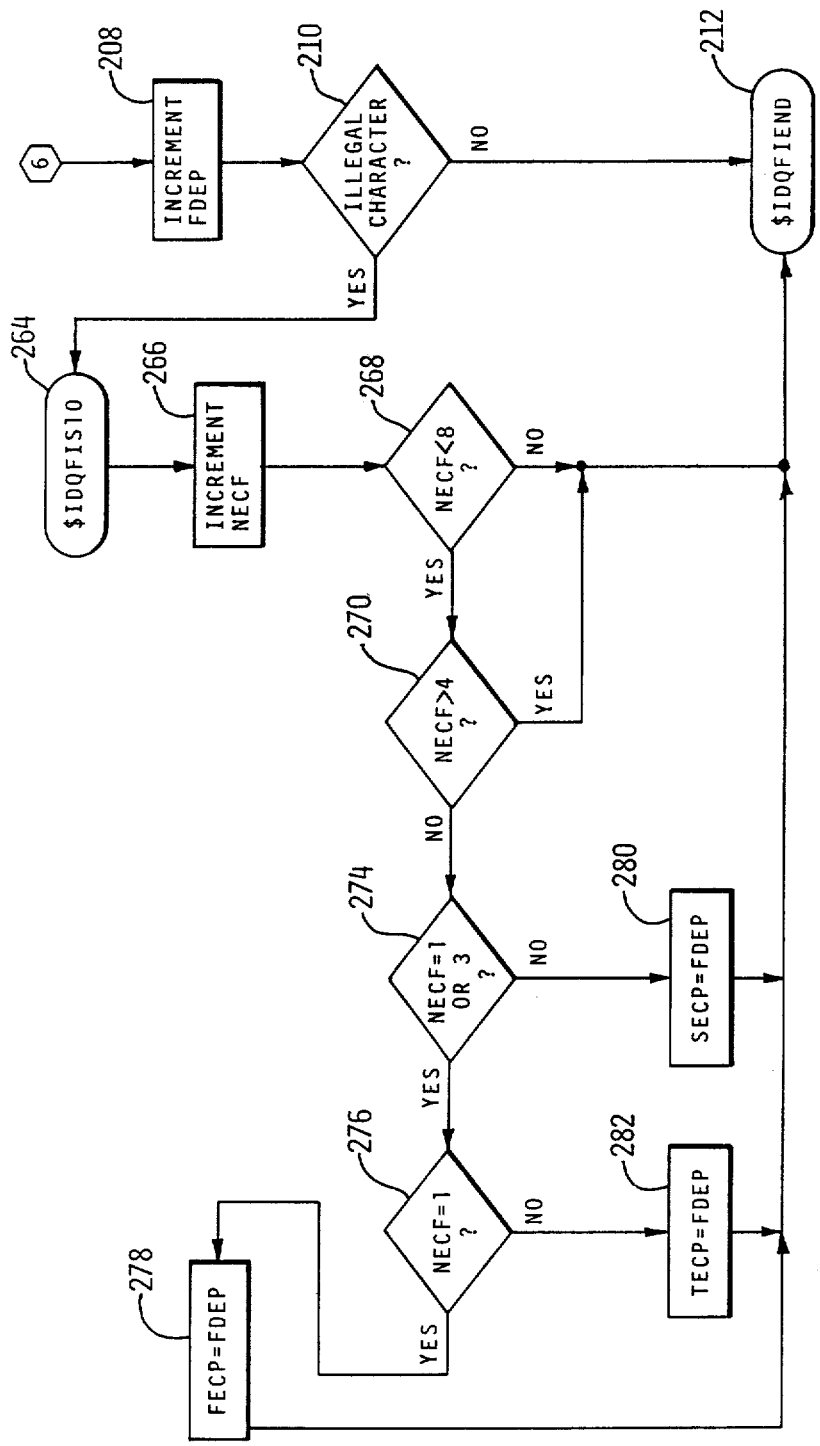

FIG. 5 is a flow chart of the firmware routines in the MDC 6 that processes character codes received from the RSA1 8. A firmware routine RSA1-QF1 200 analyzes the character code for a control character, a queue field identifier character, or a data character. Firmware routine 200 identifies the start of document and the end of document characters as well as the queue symbols, thereby defining the data field. The start and end of field characters may be control characters or queue symbols. Queue symbols are translated into queue field identifier characters as the output of RAMs 106, 108, 110 and 112 of FIG. 3.

The firmware initially selects the output of MUXs 114 and 116, signals DATDC0-7+00, which are applied to input terminal 3 of MUX 42. The output of MUX 42 signals ADPDS0-7+02, are applied to MDC 6. Decision block 202 examines signal ADPDS0+02 which, if at logical ONE, indicates a control character. The firmware then tests signals ADPDS1-7+02 in decision block 214 for the end of document (EOD) character. If the control character is an EOD character, then in block 216 a hexadecimal 84 is stored in the field closing queue (FCQ) character address location in scratchpad memory 300, FIG. 6.

Decision block 218 tests signals ADPDS1-7+02 for a read area 2 (RA2) control character. If the RA2 control character is sensed, then in block 220 a hexadecimal 82 is stored in the FCQ address location. RA2 is called a pseudo queue field identifier which indicates that an area in the document was purposely skipped and the read head reactivated.

Decision block 244 tests signals ADPDS1-7+02 for the start of document (SOD) control character. If this control character is not an SOD character, then it is a read head identification (HID) character; and in block 222, a hexadecimal 81 is stored in the FCQ address location. If decision block 244 senses the SOD character, then firmware routine $IDQFIEXIT 206 is called.

If decision block 202 indicates that the character received is not a control character, that is, signal ADPDS0+02 is at logical ZERO, then the firmware selects the outputs of RAMs 106, 108, 110 and 112 which are applied to input terminal 1 of MUX 42 as signals XLTDT0-7+00.

Figure 6:
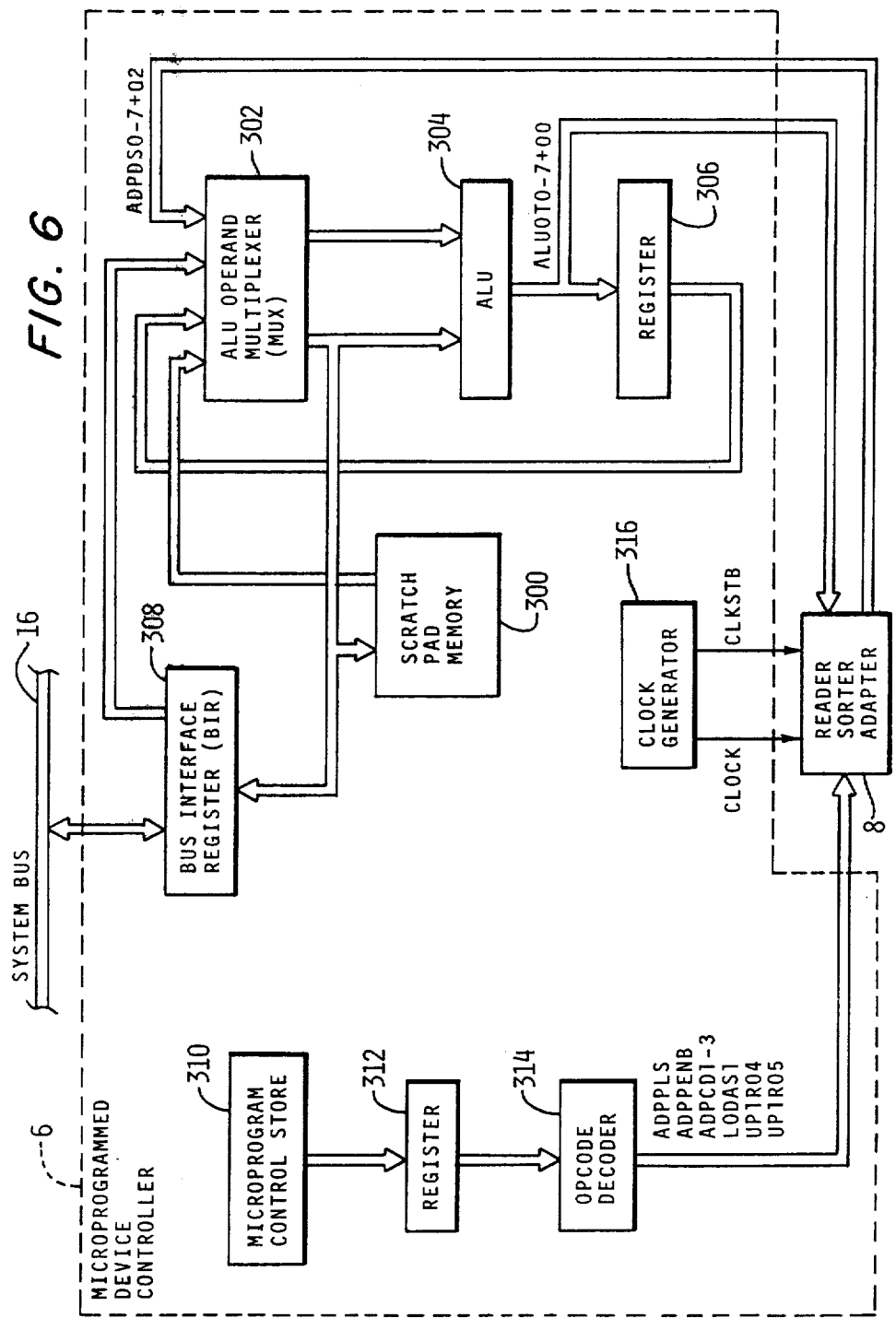
FIG. 6 is a block diagram of the microprogrammed device controller.

Decision block 204 tests signal ADPDS0+02, but this time the signal at logical ONE indicates a queue symbol, and at logical ZERO, indicates that an information character was read. If an information character was read, then firmware routine $IDQFIEXIT 206 is called. The field data end position (FDEP) count stored in scratchpad memory 300, FIG. 6, is incremented in block 208. The FDEP stores a count of the number of character positions—the last character in the field is from the head character.

Decision block 210 checks if the character received is an illegal character. If it is not an illegal character, then the firmware subroutine $IDQFIEND 212 starts a sequence which results in the character being loaded into main memory 4 and RSA1 8 is ready to send the next character to MDC 6.

After the control character is identified and the appropriate code written in the FCQ address location, a firmware routine, $IDQFI200 224, is called which, in decision block 226, tests if a control character or a queue field identifier character was received previously during the reading of the document. If not, then firmware routine $RSA1-QFIB 230 is called to initialize the basic fields.

Block 232 initializes a number of address locations in scratchpad memory. The FDEP address location is initialized to hexadecimal FF and the field data start position (FDSP) address location is initialized to hexadecimal 01. Also, the read head that is operative is identified in the number of error characters in field (NECF) address location.

Firmware subroutine $RSA1-QFIA 234 in block 236 stores the contents of the FCQ address location hexadecimal 81, if the first character is the HID character, into the field opening queue (FOQ) address location and clears the FCQ address location to hexadecimal 00. Also cleared are the first, second and third error character positions (ECPs) address locations and the lower bit positions of the NECF address locations.

Block 238 sets an indication that the first control character of the document was received and the queue field is open.

Routine $IDQFIEXIT 206 now increments the FDEP address location to hexadecimal 00 in block 208.

Decision block 204 recognizes that a queue field identifier code from RAMs 106, 108, 110 and 112, FIG. 3, was received, and in block 240 the character code is stored in the FCQ address location with the bit position 0 set at binary ZERO. Decision block 242 tests the queue field and if it is open, calls for routine $QFI-WRT 244. $QFI-WRT 244 is the subroutine which stores a completely assembled queue field identifier block of address locations FOQ, FCQ, FDSP and FDEP of scratchpad memory 300 into memory 4.

Decision block 252 tests if eight characters are stored in the above address locations. If there are 8 characters stored, then in block 254 the 8 characters are transferred to memory 4, and in block 258 the firmware returns to block 246.

If the result of decision block 252 tests negative, then in block 256 a data truncated flag is set to indicate that a QFI field was not forwarded to main memory 4. In block 258, the firmware returns to block 246. Here, the contents of FDEP has hexadecimal 2 added to it and the answer stored in the field data start position (FDSP) address location of scratchpad memory 300. This defines the position of the first data character in the next QFI field of the document.

Firmware routine $RAI-QFIA 234 is called, and in block 236 the contents of address location FCQ is stored in address location FSQ, and in block 208 the contents of address location FDEP is incremented. Decision block 210 again checks for an illegal character. The legal queue field identifier character is stored in main memory 4 in the firmware sequence started by routine $IDQFIEND 212. Subsequent data characters are read, incrementing address location FDEP in block 208 as described supra so that address location FDEP stores a count of the position—the current character in the data field is from the head identifier character.

If decision block 202 senses a control character such as an end of document (EOD) character code, hexadecimal 84 is loaded into address location FCQ in block 216, and firmware routine $IDQFI200 244 is called. Decision block 226 calls firmware routine $QFI-WRT 244.

Previously, decision block 242 called firmware routine $QFI-WRT 244 which transferred the contents of address locations FCQ, FSQ, FDEP, FDSP and the error count and error character positions to main memory 4, and returned to block 246. Here the EOD character initiates the calling of firmware routine $QFI-WRT 244 which transfers the contents of the above address locations FCQ, FSQ, FDEP, FDSP and the error count and error character positions to main memory 4. The routine 244 returns to call firmware routine $RSA1-QFIB 230.

Detection of EOD from the device indicates no further data character from the document is to be transferred, thus implying no further building of QFIs.

If decision block 210 indicates an illegal character, then firmware subroutine $IDQFI510 264 is called. In block 266 the number of error characters in field (NECF) is incremented. In decision block 268 the NECF is tested for greater than 8 errors. If there are more than 8 errors in the field, the routine is terminated and firmware routine $IDQFIEND 212 is called. If decision block 268 shows less than 8 errors, then decision block 270 tests for less than 4 errors. If NECF indicates less than 4 errors, then decision block 274 tests for 1 or 3 errors, and decision block 276 tests for 1 error. Block 278 stores an indication of the first error character position (FECP), block 280 stores an indication of the second error character position and block 282 stores an indication of the third error character position, and the end firmware routine $IDQFIEND 212 is called.

FIG. 6 is a block diagram of the microprogrammed device controller 6.

Character signals ADPDS0-7+02 are received from the RSA1 8 through an arithmetic logic unit (ALU) 304 and multiplexer (MUX) 302 and stored in a scratchpad memory 300. Information from scratchpad memory 300 is transferred to a register 306 via MUX 302 and an ALU 304. The information stored in register 306 is transferred out on system bus 16 via MUX 302 and a bus interface register (BIR) 308.

Signals ALUOT0-7+00 are sent to the RSA1 8 from the system bus 16 via BIR 308, MUX 302 and ALU 304.

The control signals ADPPLS, ADPPENB, ADPCD1-3, LODAS1, UP1RO4 and UP1RO5 are generated from microwords read from a microprogram control store 310, stored via register 312 and decoded by an upcode decoder 314. Clock generator 316 develops the CLOCK and CLKSTB signals which are applied to RSA1 8.

Figure 7:
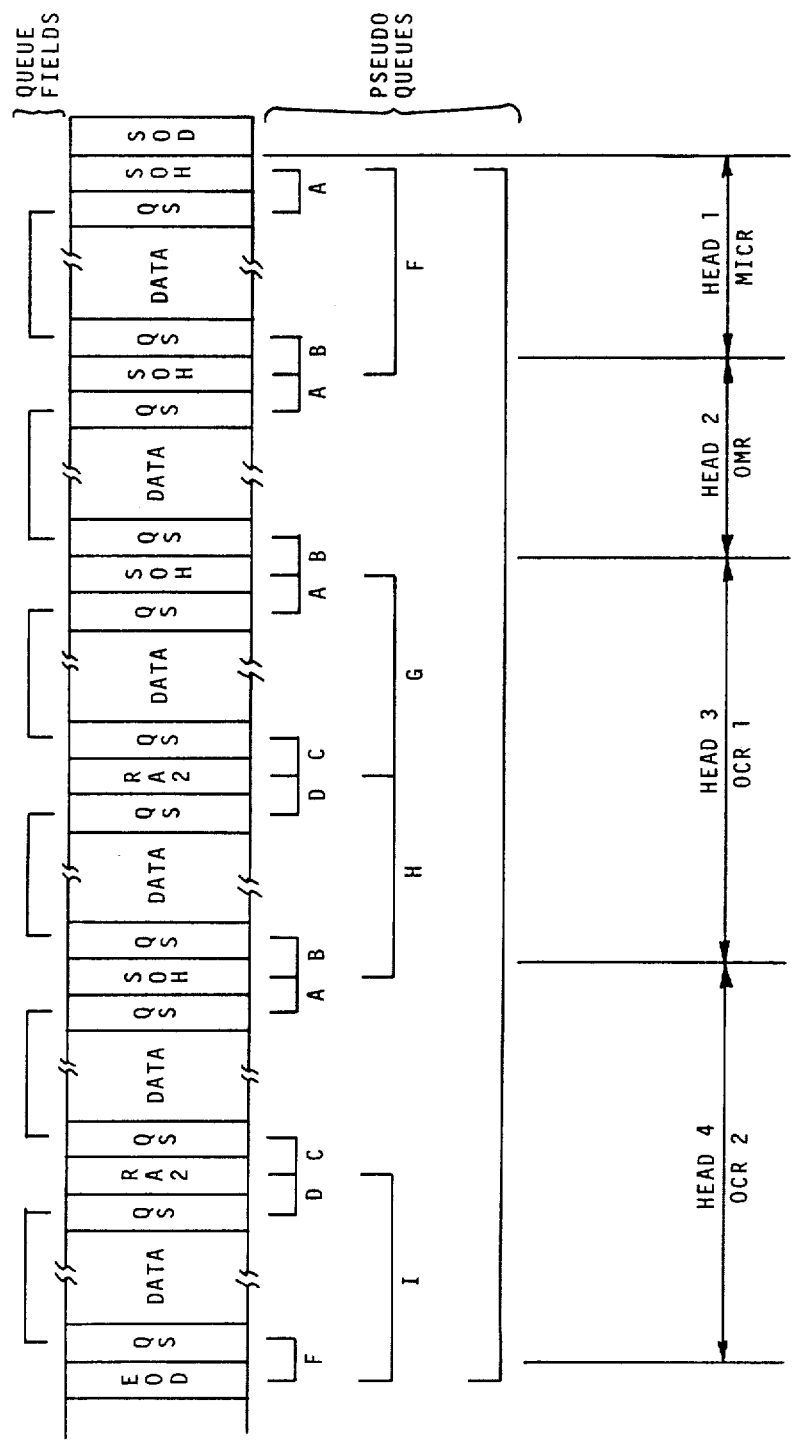
FIG. 7 shows the character sequence received by the reader sorter adapter.

FIG. 7 shows a typical stream of characters from a document having an MICR field, an OMR field, an OCR1 field and an OCR2 field. The start of document (SOD), start of head (SOH), read area 2 (RA2), and end of document (EOD) characters are the pseudo queue field characters. Queue symbol (QS) characters are translated to queue field identifier (QFI) characters in the translation and queue marker Table 38, FIG. 2.

The notation SOH-QS indicates that the start of head is stored in address location FOQ and the queue symbol is stored in address location FCQ of scratchpad memory 300.

A. SOH-QS indicates the start of the first read area of this head.
B. QS-SOH indicates the end of a read area of this head.
C. QS-RA2 indicates the end of the first read area of this head.
D. RA2-QS indicates the start of read area 2.
E. QS-EOD indicates the last read area of the document.
F. SOH-SOH indicates that no QS characters and data were detected for this head.
G. SOH-RA2 indicates that no data and no QS characters were detected in the first read area of this head.
H. RA2-SOH indicates that no data and no QS characters were detected in the second read area of this head.
I. RA2-EOD indicates that no data and no QS characters were detected in the last read area of the document.
J. SOH-EOD indicates that either no QS characters were detected in the document or in the last read head or read heads.

The contents of address locations FOQ and FCQ, when examined by the CPU 2, will indicate the status of the reading of the document by reader sorter 10.

FIG. 8 shows the contents of PROMs 114 and 116. The address locations are shown in hexadecimal form. Signals XLTQD1-3+00 and RSDAT1-7, applied to the address terminals, select the 10 low order bits of the 12-bit hexadecimal address location shown in FIG. 8. The 11th and 12th bit positions are at binary ZERO. The 9th and 10th bit positions indicate the operative read head and are a representation of the state of signals XLTQD1+00 and XLTQD2+00.

The contents of the selected address location appear on the 8 signal lines DATDC0-7+00 and are shown in FIG. 8 in hexadecimal form.

The following chart shows the interpretation of the bits of the contents of selected address locations:

|     | Signal     | Weight | Bit 0 = 0          | Bit 0 = 1       |
|-----|------------|--------|--------------------|-----------------|
| MSB | DATDC0 + 00 | 8      | 0                  | 1               |
|     | DATDC1 + 00 | 4      | Can't Read         | Read Area 2     |
|     | DATDC2 + 00 | 2      | Symbol             | Head 1ID (MICR) |
|     | DATDC3 + 00 | 1      | Dash or Space      | Head 2ID (OMR)  |
|     | DATDC4 + 00 | 8      | Transit Symbol     | Head 3ID (OCR1) |
|     | DATDC5 + 00 | 4      | Numeric            | Head 4ID (OCR2) |
|     | DADTC6 + 00 | 2      | Alpha              | SOD             |
| LSB | DATDC7 + 00 | 1      | Field Format Error | EOD             |

As an example, the content of address location hexadecimal 17A is hexadecimal C4. Hexadecimal 17A, expressed as a binary number, is 0001 0111 1010. The 11th and 12th bit positions contain binary 00 and are ignored. The 10th and 9th bit positions contain binary 01 respectively indicating that the character was read by read head 3. Hexadecimal C4 expressed as a binary number, binary 1100 0100, indicates a read area 2 character associated with head 4. This is an indication to the MDC 6 that head 3 has completed the reading of the OCR1 field, and the document will pass to the read head 4 read station for reading the OCR2 field.

Figure 9:
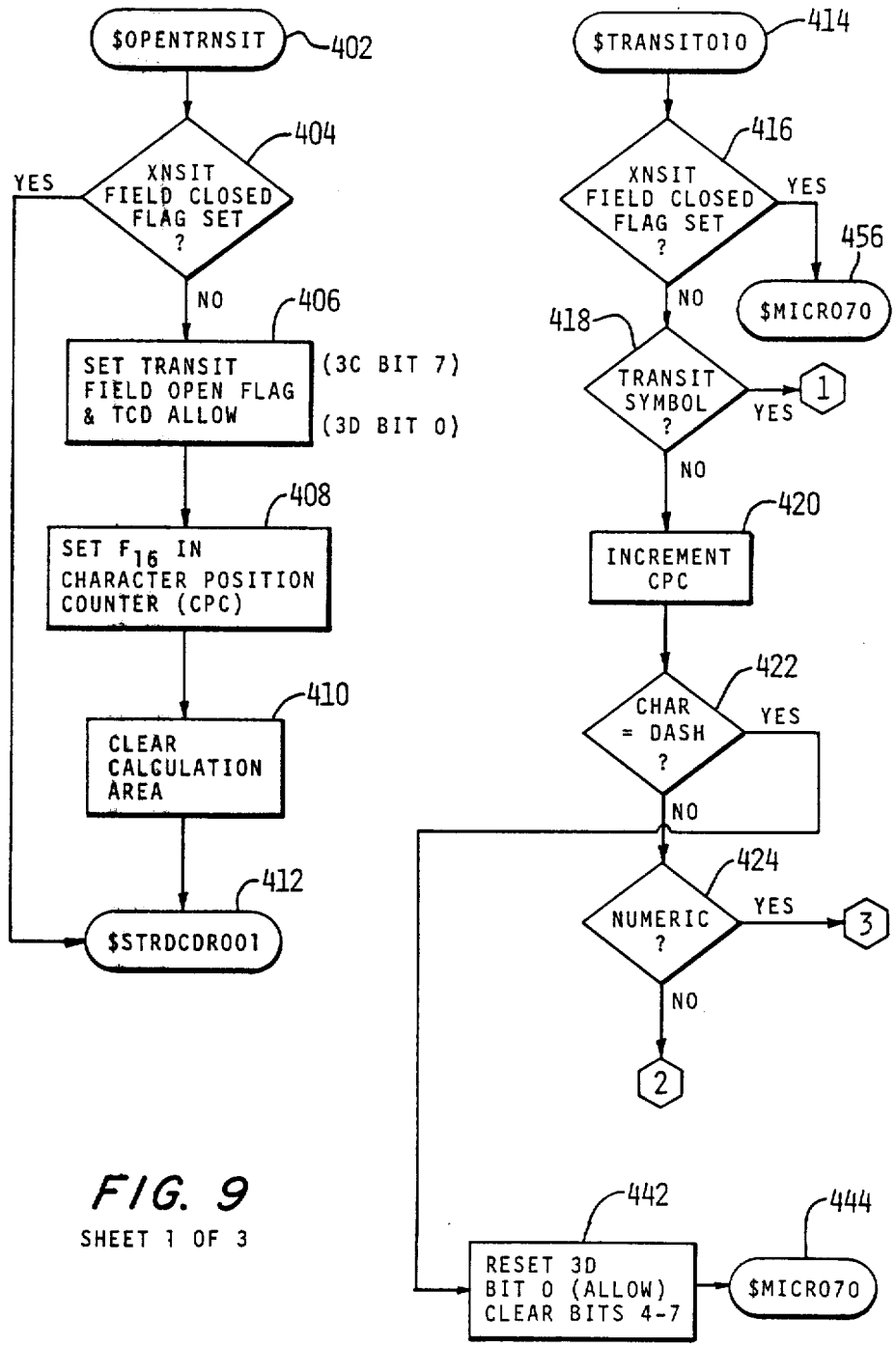
FIG. 9 is a flow diagram of the firmware sequences in the microprogrammed device controller which performs the check digit processing.
Figure 9:
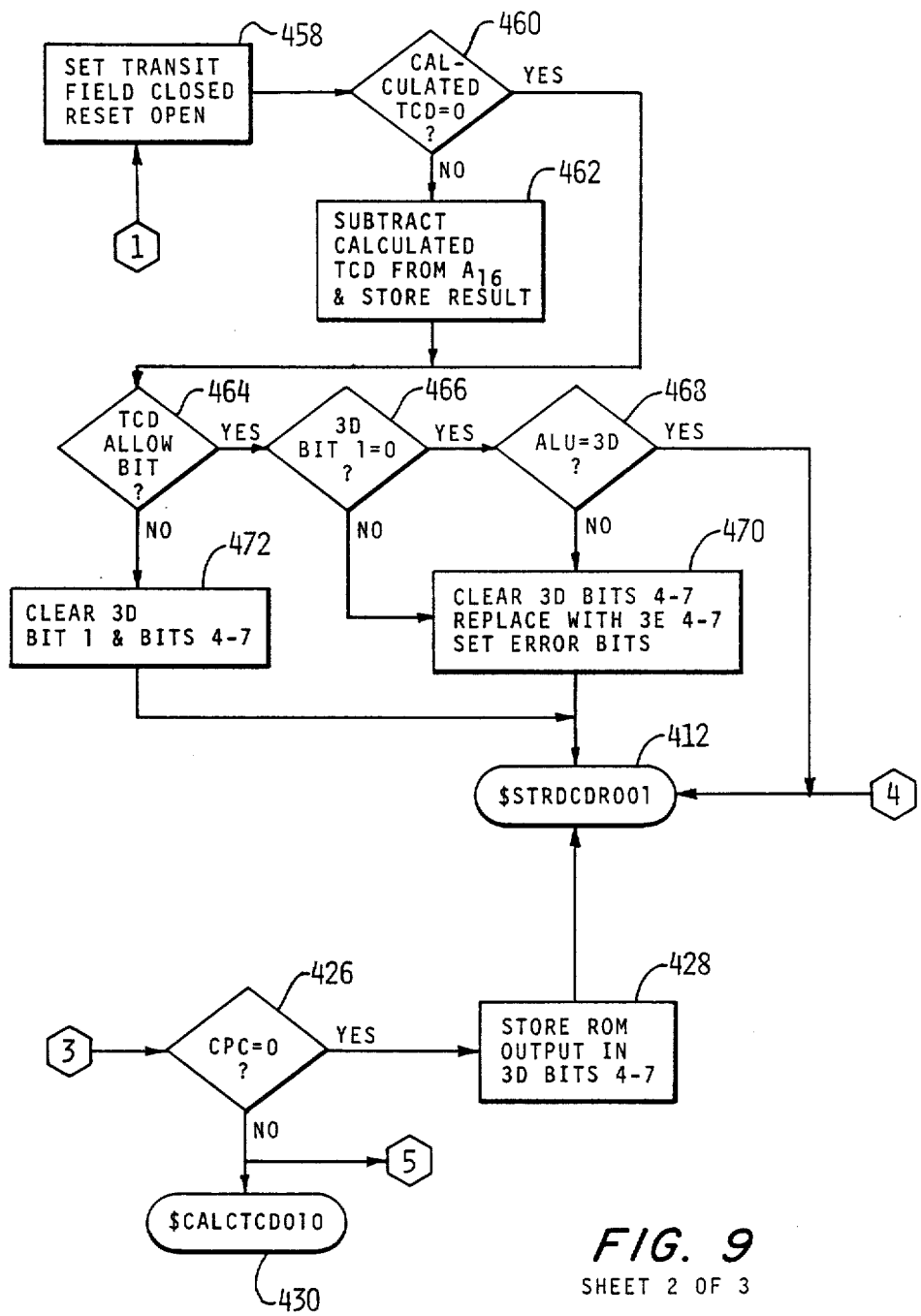
Figure 9:
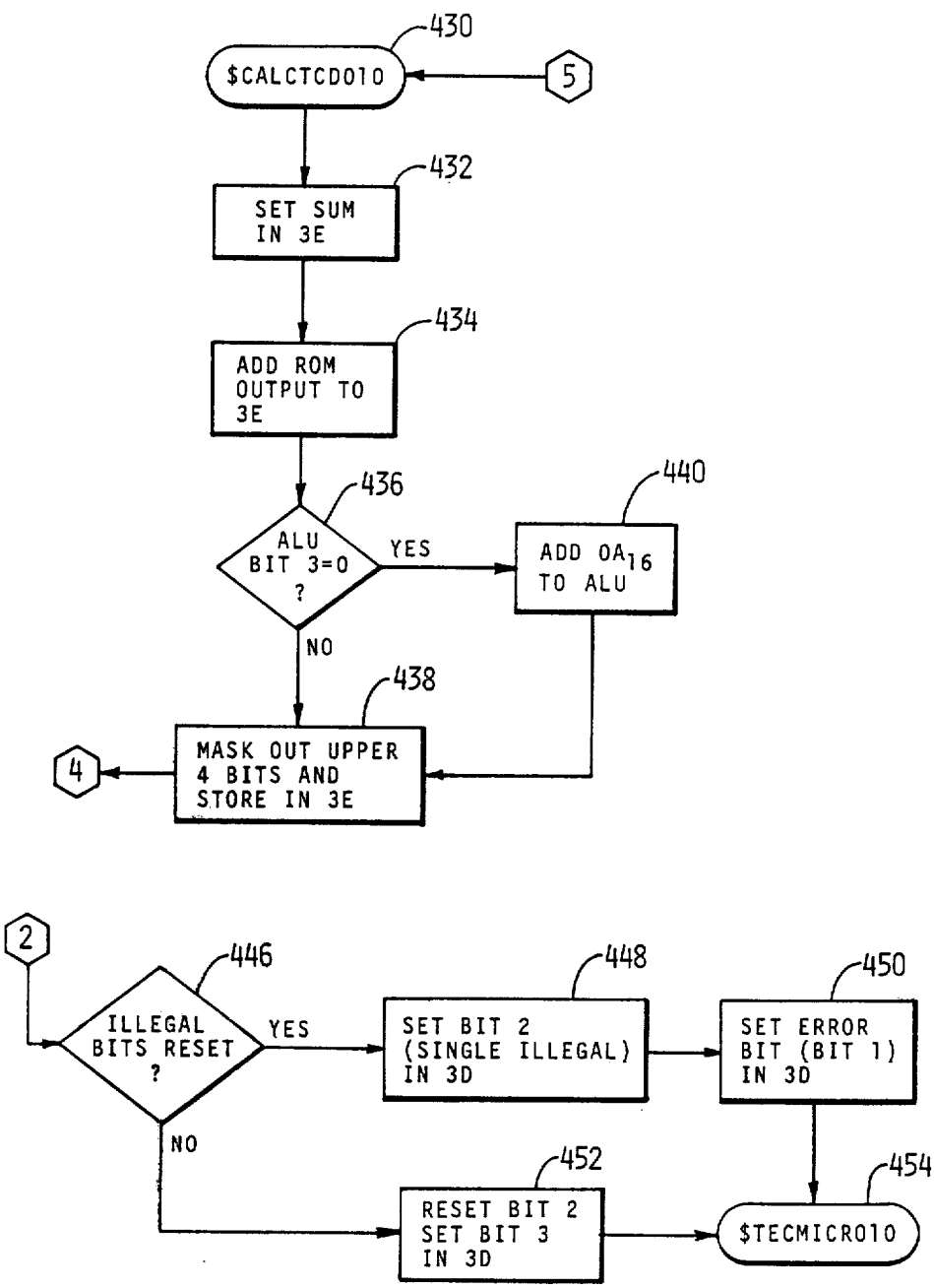

FIG. 9 is the flow diagram of the firmware sequences in the MDC 6 which control the transit field check digit calculation. The transit field read from the check by reader sorter 10 has nine decimal digits bracketed by transit characters. The first transit character read from the document conditions the next character received as a check digit and is stored in bit positions 4-7 of address location 3D in scratchpad memory 300. Subsequent decimal digits are multiplied by the appropriate decimal value by means of CPC 26 and PROM 28, FIG. 2. Each low order 4 bits of the product is added to the contents of bit positions 4-7 of address location 3E in scratchpad memory 300. The second transit character read (after the ninth decimal digit) conditions the firmware to compare bit positions 4-7 of address locations 3D and 3E in scratchpad memory 300 for equality, thereby indicating the correct reading of the transit field. If a "can't read" or misread character was sensed, then the calculation would not compare locations 3D and 3E, and a check digit error status flag would be set.

When the transit character is read by reader sorter 10 and is sensed in the MDC 6, firmware routine $ OPEN TRNSIT routine 402 is called. Decision block 404 checks the content of bit position 6 of address location 3C of scratchpad memory 300, which stores a transit field closed flag. If the transit field closed flag is reset indicating that the character is a transit character which may indicate the start of the transit field, then the set transit field open flag, bit 7 address location 3C, and bit position 0 of address location 3D are set in block 406. A binary ONE in bit position 0 of address location 3D indicates that the firmware is in a check digit calculation mode.

Hexadecimal F (1111) is set into character position counter 150 (CPC) of FIG. 3 in block 408, and in block 410 the calculation area bit positions 3-7 of address location 3E are cleared to 00 and the firmware exits to firmware routine $STRDCDR001 412 to await the next character.

The first character read in the transit field is the check digit which initiates firmware routine $TRANSIT010 414. Decision block 416 tests if the transit field closed flag is set and if not, decision block 418 tests for a transit character. Receiving a transit character indicates the end of the transit field. Since the first character is not a transit character, block 420 increments the CPC 150 to hexadecimal ZERO. Here the first character is the check digit. Decision block 422 tests if the character is a dash. Previous American Banking Association Standards called for a dash in the transit field and no check digit. Reading a dash results in resetting the contents of bit positions 0 and 4-7 of address location 30 in block 442 and calling firmware routine $MICRO70 444. This aborts the check digit calculation.

Decision block 424 tests if the character is a numeric, and decision block 426 tests if this numeric character is the first character received following the receiving of the first transit character by testing if the value stored in the CPC 150 is hexadecimal ZERO.

The first character, the check digit, is stored in bit positions 4-7 of address location 3D in block 428, and the firmware exits to firmware routine $STRDCDR001 412 to await the next character.

When the next character is received, firmware routine $TRANSIT010 414 is called. The CPC 150 is incremented to hexadecimal 1 in block 420, and decision block 426 now calls firmware routine $CALCTCD010 430 to perform a check digit calculation.

In block 432, the contents of the calculation are bit positions 3-7 of address location 3E, in this case binary 00000, are brought to ALU 304, FIG. 6, and added to the output of PROM 152, FIG. 3, through block 434.

Decision block 436 examines the contents of bit position 3 of address location 3E. If it is a binary ZERO, then hexadecimal A (1010) is added to the result in block 440; and in block 438, the low order four bits of the result are stored in the calculation area, bit positions 4-7 of address location 3E. Decision block 436 tests bit position 3 of address location 3E. A binary ZERO indicates that in block 440 a hexadecimal A is added to the contents of bit positions 4-7 of address location 3E in ALU 304, FIG. 6. The action indicated in blocks 436 and 438 are for correcting the result obtained when using excess-6 four bit binary coded decimal notation. When the closing transit character is received, hexadecimal A is subtracted from the result giving a 4-bit binary coded decimal number. The result is stored in bit positions 4-7 of address location 3E in block 438, and firmware routine $STRDCDR001 412 awaits the next character.

The above $TRANSIT010 414 firmware routine is repeated for the remaining characters in the transit field. The transit character closing the field is recognized in decision block 418 which results in setting the field closed flag and resetting the field open flag in block 458.

Decision block 460 tests if the result stored in the calculation area is equal to the hexadecimal ZERO. If the result stored is not equal to ZERO, then block 462, hexadecimal A (1010) is subtracted from the result and the new result is stored in the calculation area.

If the decision block 460 test indicates that the result stored in the calculation area was equal to hexadecimal 00, or if block 462 was processed, then decision block 464 is called. Decision block 464 tests if the transit field calculation was aborted because a dash was detected, that is, address location 3D bit position 0 was reset in block 442. If no dash was received, then decision block 466 tests if the check digit error flag is set. If it is not set, indicating correct operation, then decision block 468 compares the check digit stored in the first address location with the result stored in the calculation area in ALU 304. An equal response indicates that the transit field was read correctly.

If decision block 464 indicates that a dash was received, then in block 472 the check digit is cleared from address location 3D and firmware routine $STRDCDR001 412 is called.

If decision block 466 indicates a check digit error or decision block 468 indicates a non-comparison between the check digit and the calculated check digit, then in block 470 the check digit in address location 3D is replaced by the calculated check digit stored in address location 3E, and firmware routine $STRDCDR001 412 is called.

If decision block 424 indicates that the character received was not a numeric, then decision block 446 examines the check digit error flag in address location 3D bit position 1. If the bit is reset indicating no previous error, then block 448 sets a single illegal character flag in address location 3D bit position 2. Block 450 then sets the check digit error flag in address location 3D bit position 1 and the firmware exists to firmware routine $TECMICR010 454 to await the next character.

If desicion block 446 shows the check digit error flag to be set indicating that a previous error character was received, then decision block 452 resets bit position 2 of address location 3D which indicates a single error, and sets bit position 3 of address location 3D indicating multiple character errors. The firmware then exits to firmware routine $TECMICR010 454 which will examine the error status and make a decision on the processing of the document in the reader sorter-1 10.

FIG. 10 shows the contents of PROM 152. Address locations, hexadecimal 030 through 039, store the check digit value. The locations are addressed by ASCII numeric characters 0 through 9 which are binary coded as 11 0000 through 11 1001 by signals RSDAT2+00 through RSDAT7+00 respectively, and signals FLDCT0-3+00 coded as binary 0000.

Address locations, hexadecimal 070 through 079, store the units digit obtained by multiplying the numeric character in field position 1 by the value of 7. The signal FLDCT3+00, the output of CPC 150 at binary ONE, is applied to address terminal 64 of PROM 152, FIG. 3. An ASCII numeric 5, binary coded as 110101 in field position 1, is multiplied by 7 with a result of decimal 35.

The units position hexadecimal 5, binary coded 0101, in the excess-6 form is hexadecimal B binary coded as 1011 which is stored in address location hexadecimal 075. Signals FLDCT3+00, RSDAT2+00, RSDAT3+00, RSDAT5+00 and RSDAT7+00 at logical ONE, applied to the address terminals 64, 32, 16, 4 and 1 of PROM 150, select address location hexadecimal 075.

The remaining contents of PROM 150 may readily be determined by one skilled in the art.

The address locations store the hexadecimal value of the units position of the product in excess-6 form of the numeric character multiplicand and a predetermined multiplier.

| Character Positions | 8 | 7 | 6 | 5 | 4 | 3 | 2 | 1 | (0) |
|---|---|---|---|---|---|---|---|---|---|
| Multiplier | 3 | 7 | 1 | 3 | 7 | 1 | 3 | 7 | 1 |
| Transit Field | 2 | 4 | 6 | 8 | 0 | 9 | 7 | 5 | |
| Product-Units Position | 6 | 8 | 6 | 4 | 0 | 9 | 1 | 5 | |
| Sum of Products-Units Position | | | | | | | | | 9 |
| Check Digit | | | | | | | | | 1 |
| Product From PROM 28 | | | | | | | | | |
| Addr. loc. (hex) | 232 | 1F4 | 1B6 | 178 | 130 | 0F9 | 0B7 | 075 | 031 |
| Contents (hex) | C | E | C | A | 6 | F | 7 | B | (1) |
| SUM of Products | | | | | | | | | 1 + 9 = 0 |

The above chart shows the check digit calculation. The transit field characters are multiplied by their respective multipliers and the units positions added, giving a total of decimal 9.

$$7 \times 5 + 3 \times 7 + 1 \times 9 + 7 \times 0 + 3 \times 8 + 1 \times 6 + 7 \times 4 + 3 \times 2$$
$$5 \quad\quad 1 \quad\quad 9 \quad\quad 0 \quad\quad 4 \quad\quad 6 \quad\quad 8 \quad\quad 6 = 9$$

The check digit in character position 0, therefore, is a decimal 1 in order to make the field units position check total equal to decimal 0.

The contents of the address locations show the units position product in excess-6 form. The MDC 6 calculation is shown in FIG. 9, blocks 432 and 434, decision block 436, and blocks 438 and 440. The calculated check digit is compared with the check digit in the transit field read from the document and is shown in decision block 460, block 462, decision block 468, and block 470.

| Character Position | Product From PROM 28 | Block 432 | Block 434 (Decision) Block 436) | Block 440 | Block 438 |
|---|---|---|---|---|---|
| 1 | B(1011) | 0000 | (0)1011 | 1010 | 0101 |
| 2 | 7(0111) | 0101 | (0)1100 | 1010 | 0110 |
| 3 | F(1111) | 0110 | (1)0101 | — | 0101 |
| 4 | 6(0110) | 0101 | (0)1011 | 1010 | 0101 |
| 5 | A(1010) | 0101 | (0)1111 | 1010 | 1001 |
| 6 | C(1100) | 1001 | (1)0101 | — | 0101 |
| 7 | E(1110) | 0101 | (1)0011 | — | 0011 |
| 8 | C(1100) | 0011 | (0)1111 | 1010 | 1001 |

From decision block 460, calculated check digit 1001 does not equal 0. Therefore, in block 462, subtracting hexadecimal 9 (1001) from hexadecimal A (1010) gives a check digit of hexadecimal 1 (0001) which compares in decision block 468 with the check digit read from the document.

Note that decision block 436 tests bit 3, the bit in the brackets and adds hexadecimal A if bit 3 is a binary ZERO.

Following is a table identifying the logical elements of this embodiment:

| The TTL Data Book for Design Engineers, Second Edition, published by Texas Instruments | |
| --- | --- |
| Decoders 50, 52, 54 | 74LS138 |
| Counters/Registers 26, 58, 60 94, 96, 102 | 74LS169 |
| D Flop 104 | 74LS74 |
| MUX 42 | 74LS253 |

| Signetics Bipolar & MOS Memory Data Manual 1977 Edition, page 126 | |
| --- | --- |
| PROMS 28, 114, 116 | 82S137 |

| Signetics Logic - TTL Data Manual copyright 1978, page 625 | |
| --- | --- |
| Register 56 | 9334 |

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the intention, therefore, to limit the invention only as indicated by the scope of the claims.

What is claimed is:

1. A document processing system comprising:
a reader sorter for reading characters sequentially from a document and generating character signals indicative of a starting character of a field, a closing character of said field, and a plurality of numeric characters within said field, said plurality of numeric characters including a check digit character and a plurality of decimal digit characters;
an adapter coupled to said reader sorter and responsive to said character signals representative of said plurality of decimal digit characters for generating a plurality of position count signals indicative of a position of each of said plurality of decimal digit characters in said field, said adapter including a memory unit responsive to said character signals indicative of said plurality of decimal digit signals and a corresponding one of said plurality of position count signals for generating a plurality of product signals, each representative of the units position of the result of the multiplication of said one of said plurality of decimal digit characters by one of a plurality of predetermined numbers as indicated by said corresponding one of said plurality of position count signals; and,
a microprogrammed controller coupled to said reader sorter and to said adapter and including a control store responsive to said character signals indicative of said starting and said ending characters for generating a first and a second plurality of control signals, said adapter being responsive to said first plurality of control signals for generating said plurality of product signals,
said controller including an arithmetic logic unit responsive to said second plurality of control signals and said plurality of product signals for generating signals indicative of said calculated check digit characters, and being further responsive to said character signals indicative of said check digit character for comparison with said calculated check digit characters.

2. The system of claim 1 wherein said adapter comprises:
a character position counter responsive to a first of said plurality of control signals for resetting said character position counter to a predetermined count when said character signals indicative of said starting character are received by said controller, and responsive to a second of said plurality of control signals for generating count signals indicative of said position of each of said plurality of numeric characters in said field;
said memory means coupled to said character position counter and responsive to said character signals and said count signals for generating said product signals; and,
a multiplexer coupled to said memory unit and responsive to a third of said plurality of control signals for transferring said product signals and said count signals to said controller.

3. The system of claim 2 wherein said controller comprises:
said microprogrammed control store coupled to said adapter and responsive to said character signals representative of said starting character for generating said first plurality of control signals, including said first control signal for resetting said character position counter, said second control signal for incrementing said character position counter, and said third control signal for enabling said multiplexer for transfer of said product signals and said count signals to said controller.

4. The system of claim 3 wherein said microprogrammed controller further generates a starting field flag in response to receiving said character signals representative of said starting character from said adapter.

5. The system of claim 4 wherein said controller further comprises:
a scratchpad memory for storing bits representative of said check digit character in a first address location, bits representative of a partial sum of said calculated check digit character in a second address location, and a bit representative of said starting flag in a third address location in response to said second plurality of control signals; and,
said arithmetic logic unit coupled to said scratchpad memory and to said adapter and responsive to scratchpad signals representative of the contents of said second address location and said product signals for generating said partial sum for storage in said second address location when said bit representative of said starting flag is stored in said third address location in response to said second plurality of control signals.

6. The system of claim 5 wherein said controller further generates a closing field flag in response to receiving said character signals representative of said closing character from said adapter.

7. The system of claim 6 wherein said scratchpad memory stores a bit representative of said closing flag in said third address location, said arithmetic logic unit being responsive to said closing flag bit for comparing said first and second address locations for equals indicative of said controller verifying said plurality of numeric characters of said field read by said reader.

8. The system of claim 7 wherein said opening and closing characters and said field is a transit field.

* * * * *